US011252259B2

United States Patent
Ren et al.

(10) Patent No.: US 11,252,259 B2
(45) Date of Patent: Feb. 15, 2022

(54) SERVICE PROCESSING METHOD, MOBILE EDGE COMPUTING DEVICE, AND NETWORK DEVICE

(71) Applicant: Huawei Technologies Co., Ltd., Shenzhen (CN)

(72) Inventors: Dewang Ren, Xi'an (CN); Heng Jin, Shenzhen (CN); Xiaolin Gui, Xi'an (CN); Kaiyuan Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 16/817,342

(22) Filed: Mar. 12, 2020

(65) Prior Publication Data

US 2020/0213419 A1      Jul. 2, 2020

Related U.S. Application Data

(63) Continuation of application No. PCT/CN2018/104032, filed on Sep. 4, 2018.

(30) Foreign Application Priority Data

Sep. 12, 2017   (CN) .......................... 201710817825.6

(51) Int. Cl.
   *H04L 29/08*      (2006.01)
   *H04W 76/11*     (2018.01)
   *H04W 8/00*       (2009.01)

(52) U.S. Cl.
   CPC ............ *H04L 67/327* (2013.01); *H04L 67/10* (2013.01); *H04W 8/005* (2013.01); *H04W 76/11* (2018.02)

(58) Field of Classification Search
   CPC ...... H04L 67/10; H04L 67/327; H04W 76/11; H04W 8/005
   See application file for complete search history.

(56) References Cited

U.S. PATENT DOCUMENTS

9,942,825 B1 *    4/2018   Narayanan ............ H04L 63/306
10,873,886 B2    12/2020   Shi et al.
(Continued)

FOREIGN PATENT DOCUMENTS

CN        103188721 A      7/2013
CN        103619042 A      3/2014
(Continued)

OTHER PUBLICATIONS

"Annexure ETSI MEC analysis," 3GPP TSG-SA WG6 Meeting #17, Prague, Czech Republic, S6-170605 (revision of S6-17xxxx), Total 4 pages, 3rd Generation Partnership Project, Valbonne, France (May 8-12, 2017).
(Continued)

*Primary Examiner* — Azizul Choudhury
(74) *Attorney, Agent, or Firm* — Leydig, Voit & Mayer, Ltd.

(57) ABSTRACT

This application discloses a service processing method, a mobile edge computing device, and a network device, to resolve a technical problem of low resource utilization of an MEC in the prior art. The method includes: receiving, by a first mobile edge computing device, a first service request, where the first service request includes a service type and/or service content; sending, by the first mobile edge computing device, a second service request to a second mobile edge computing device, where the second service request includes at least part of the service type and/or at least part of the service content, and identification information of the first mobile edge computing device; and receiving, by the first mobile edge computing device, service data corresponding to the second service request from the second mobile edge computing device.

10 Claims, 13 Drawing Sheets

(56) References Cited

U.S. PATENT DOCUMENTS

| | | | |
|---|---|---|---|
| 2014/0334306 A1 | 11/2014 | Yang et al. | |
| 2016/0366244 A1 | 12/2016 | Chiu et al. | |
| 2017/0034643 A1* | 2/2017 | Young | H04W 4/02 |
| 2017/0085628 A1 | 3/2017 | Mahindra et al. | |
| 2017/0104847 A1 | 4/2017 | Zhang et al. | |
| 2017/0118311 A1* | 4/2017 | Frydman | H04L 67/42 |
| 2017/0201571 A1* | 7/2017 | Sherf | H04L 67/1008 |
| 2017/0237607 A1 | 8/2017 | Smith | |
| 2018/0367314 A1* | 12/2018 | Egner | H04L 63/0428 |
| 2019/0020657 A1* | 1/2019 | Egner | G06Q 20/3224 |
| 2019/0253995 A1 | 8/2019 | Xiong et al. | |

FOREIGN PATENT DOCUMENTS

| | | |
|---|---|---|
| CN | 103648130 A | 3/2014 |
| CN | 104581831 A | 4/2015 |
| CN | 106231607 A | 12/2016 |
| CN | 106358245 A | 1/2017 |
| CN | 106412905 A | 2/2017 |
| CN | 106900011 A | 6/2017 |
| WO | 2017091934 A1 | 6/2017 |
| WO | 2017091960 A1 | 6/2017 |

OTHER PUBLICATIONS

"Annexure ETSI MEC analysis," 3GPP TSG-SA WG6 Meeting #17, Prague, Czech Republic, S6-170700 (revision of S6-170605), Total 6 pages, 3rd Generation Partnership Project, Valbonne, France (May 8-12, 2017).

Hong et al., "Mobile Fog: A Programming Model for Large-Scale Applications on the Internet of Things," MCC '13: Proceedings of the second ACM SIGCOMM workshop on Mobile cloud computing, pp. 15-20, Hong Kong, China (Aug. 2013).

Patel et al., "Mobile-Edge Computing—Introductory Technical White Paper," pp. 1-36 (Sep. 2014).

* cited by examiner

SERVICE PROCESSING METHOD, MOBILE EDGE COMPUTING DEVICE, AND NETWORK DEVICE

CROSS-REFERENCE TO RELATED APPLICATION

This application is a continuation of International Application No. PCT/CN2018/104032, filed on Sep. 4, 2018, which claims priority to Chinese Patent Application No. 201710817825.6, filed on Sep. 12, 2017. The disclosure of the aforementioned applications are hereby incorporated by reference in their entireties.

STATEMENT OF JOINT RESEARCH AGREEMENT

The subject matter and the claimed invention were made by or on the behalf of XI' AN JIAOTONG University, of Beilin District, Xi'an, P.R. China and Huawei Technologies Co., Ltd., of Shenzhen, Guangdong Province, P.R. China, under a joint research agreement titled "Research and Development of distributed network capability exposure Technologies." The joint research agreement was in effect on or before the claimed invention was made, and that the claimed invention was made as a result of activities undertaken within the scope of the joint research agreement.

TECHNICAL FIELD

Embodiments of this application relate to the field of communications technology, and in particular, to a service processing method, a mobile edge computing device, and a network device.

BACKGROUND

With diversification of service types and growth of a quantity of services, to reduce a latency of a response of a communications network to a service request, in an existing mobile communications technology network, such as a fourth-generation (4th Generation, 4G) mobile communications technology network or a fifth-generation (5th Generation, 5G) mobile communications technology network, service processing is performed by using a capability exposure architecture that uses a mobile edge computing (MEC) device. The capability exposure architecture is shown in FIG. 1.

In the capability exposure architecture shown in FIG. 1, some data processing and storage functions are moved forward to the MEC. One MEC is disposed in each preset area, and service requests from terminal devices in the area are processed in a centralized manner by using the MEC in the area.

Because service volumes of terminal devices in coverage areas of respective MECs are different, a service processing method in the prior art may cause low resource utilization of the MEC.

SUMMARY

Embodiments of this application provide a service processing method, a mobile edge computing device, and a network device, to resolve a technical problem of low resource utilization of an MEC in the prior art.

According to a first aspect, an embodiment of this application provides a service processing method. The method may be applied to a first mobile edge computing device, and the first mobile edge computing device may be any mobile edge computing device in a capability exposure architecture. In the method, a first mobile edge computing device, after receiving a first service request that includes a service type and/or service content, may send a second service request to a second mobile edge computing device, where the second service request includes at least part of the service type and/or at least part of the service content, and identification information of the first mobile edge computing device; and finally receive service data corresponding to the second service request from the second mobile edge computing device.

In the foregoing technical solutions, after the mobile edge computing device receives the service request, some or all services in the service request may be forwarded to another mobile edge computing device for processing. In this way, when a particular mobile edge computing device receives a large quantity of service requests, the service request may be forwarded to a relatively idle mobile edge computing device for processing, so that the plurality of mobile edge computing devices may collaboratively process the service requests, and resource utilization of the mobile edge computing device can be improved.

In a possible implementation, before the first mobile edge computing device sends the second service request to the second mobile edge computing device, the first mobile edge computing device determines, based on a service type and/or service content deployed on the first mobile edge computing device, that the first mobile edge computing device needs to send the second service request to the second mobile edge computing device.

In the foregoing technical solutions, the mobile edge computing device, after receiving the service request, may first determine, based on locally deployed a service type and/or service content, whether the mobile edge computing device can process the service request. If the mobile edge computing device cannot process the service request, the mobile edge computing device determines that it is necessary to forward the service request to another mobile edge computing device for processing, and then forwards the service request to the another mobile edge computing device, thereby improving service processing efficiency.

In a possible implementation, before the first mobile edge computing device sends the second service request to the second mobile edge computing device, the first mobile edge computing device determines, based on an information list of mobile edge computing devices, the second mobile edge computing device, where the information list of mobile edge computing devices includes information of the second mobile edge computing device.

In the foregoing technical solutions, the mobile edge computing device, after receiving the service request, may first determine, based on the information list of mobile edge computing devices, the second mobile edge computing device that can process the service request, and then forwards the service request to the determined mobile edge computing device, so that a signaling resource between the mobile edge computing devices is saved, thereby improving service processing efficiency.

In a possible implementation, the information list of mobile edge computing devices includes identification information of at least one mobile edge computing device; or the information list of mobile edge computing devices includes the identification information of the at least one mobile edge computing device and a service type and/or service content deployed on the corresponding mobile edge computing device.

In the foregoing technical solutions, the information list of mobile edge computing devices may include only identification information of some or all of the mobile edge computing devices. For example, the information list of mobile edge computing devices locally stored in the first mobile edge computing device may include only identification information of its neighboring mobile edge computing devices, thereby saving a storage space of the mobile edge computing device.

The information list of mobile edge computing devices may alternatively include the identification information of some or all of the mobile edge computing devices, and a service type and/or service content deployed on the corresponding mobile edge computing devices. In this way, the first mobile edge computing device may accurately determine, based on the information list, the second mobile edge computing device that can process the service request, thereby improving service processing efficiency.

In a possible implementation, the information list of mobile edge computing devices is deployed on the first mobile edge computing device. The first mobile edge computing device queries the information list of mobile edge computing devices, to determine at least one mobile edge computing device that can be configured to process the second service request; then the first mobile edge computing device sends a first inquiry message to the at least one mobile edge computing device, where the first inquiry message includes at least part of the service type and/or at least part of the service content; and the first mobile edge computing device receives an answer message from the at least one mobile edge computing device, and finally determines, based on the answer message, the second mobile edge computing device in the at least one mobile edge computing device.

In the foregoing technical solutions, the first mobile edge computing device may determine, based on the locally deployed information list of mobile edge computing devices, the second mobile edge computing device in a manner of sending the inquiry message, so that each mobile edge computing device may determine, based on an actual situation of current service processing, whether the mobile edge computing device can process the service request, and feeds back an answer message. In this way, the second mobile edge computing device determined by the first mobile edge computing device may be preferred. For example, a service processing volume of the second mobile edge computing device is relatively small, thereby reducing a waiting time length of the service request and improving service processing efficiency.

In a possible implementation, the information list of mobile edge computing devices is deployed on a management device. The first mobile edge computing device first sends a query request to the management device, where the query request includes at least part of the service type and/or at least part of the service content; then receives at least one piece of identification information corresponding to at least one mobile edge computing device from the management device, where the information list of mobile edge computing devices includes the at least one piece of identification information; and finally determines, based on the at least one piece of identification information, the second mobile edge computing device in the at least one mobile edge computing device.

In the foregoing technical solutions, another method for determining the second mobile edge computing device is provided. The first mobile edge computing device may determine, based on the information list of mobile edge computing devices that is deployed by the management device, the second mobile edge computing device in a manner of sending the query message.

In a possible implementation, the first mobile edge computing device obtains, based on the service data corresponding to the second service request, service data corresponding to the first service request; and the first mobile edge computing device sends the service data corresponding to the first service request.

In the foregoing technical solutions, the first mobile edge computing device, after receiving the service data from the second mobile edge computing device, may directly use the service data as the service data corresponding to the first service request, or may obtain the service data corresponding to the first service request after processing the service. For example, when there are a plurality of second mobile edge computing devices, service data sent by the plurality of second mobile edge computing devices may be aggregated to obtain final service data. The first mobile edge computing device may flexibly determine the service data corresponding to the first service request based on an actual situation.

According to a second aspect, an embodiment of this application provides a service processing method. The method is applied to a management device. The management device first receives a first service request from a first mobile edge computing device, where the first service request includes a service types and/or service contents; and then the management device sends service data corresponding to the first service request to the first mobile edge computing device.

In the foregoing technical solutions, the management device may receive the service request sent by the mobile edge computing device, and sends the service data corresponding to the service request to the mobile edge computing device. In this way, when a particular mobile edge computing device receives a large quantity of service requests, the service requests may be forwarded to the management device for processing, so that the mobile edge computing device and the management device may collaboratively process the service requests, thereby improving resource utilization of the mobile edge computing device and the management device.

In a possible implementation, the management device may send a second service request to a second mobile edge computing device, where the second service request includes at least part of the service type and/or at least part of the service content; and then receive service data corresponding to the second service request from the second mobile edge computing device.

In the foregoing technical solutions, the management device, after receiving the service request, may forward the second service request corresponding to the service request to another mobile edge computing device, and processes the second service request by using the another mobile edge computing device, so that a plurality of mobile edge computing devices may collaboratively process the service request, thereby improving resource utilization of the plurality of mobile edge computing devices.

In a possible implementation, before the management device sends the second service request to the second mobile edge computing device, the management device determines, based on an information list of mobile edge computing devices that is deployed by the management device, the second mobile edge computing device, where the information list of mobile edge computing devices includes information of the second mobile edge computing device.

In the foregoing technical solutions, the management device, after obtaining the second service request, may first determine, based on the information list of mobile edge computing devices, the second mobile edge computing device that can process the second service request, and then forwards the second service request to the determined mobile edge computing device, so that a signaling resource between the management device and the mobile edge computing device is saved, thereby improving service processing efficiency.

In a possible implementation, the information list of mobile edge computing devices includes identification information of a mobile edge computing device and a service type and/or service content deployed on the corresponding mobile edge computing device.

In the foregoing technical solutions, the information list of mobile edge computing devices may alternatively include the identification information of some or all of the mobile edge computing devices, and a service type and/or service content deployed on the corresponding mobile edge computing devices. In this way, the management device may accurately determine, based on the information list, the second mobile edge computing device that can process the second service request, thereby improving service processing efficiency.

In a possible implementation, the management device first obtains, based on the service data corresponding to the second service request, the service data corresponding to the first service request; and then sends the service data corresponding to the first service request to the first mobile edge computing device.

In the foregoing technical solutions, the management device, after receiving the service data from the second mobile edge computing device, may directly use the service data as the service data corresponding to the first service request, or may obtain the service data corresponding to the first service request after processing the service processing. For example, when there are a plurality of second mobile edge computing devices, service data sent by the plurality of second mobile edge computing devices may be aggregated to obtain final service data. The management device may flexibly determine the service data corresponding to the first service request based on an actual situation.

According to a third aspect, an embodiment of this application provides a mobile edge computing device. The mobile edge computing device has a function of implementing a behavior of the first mobile edge computing device in the method according to the first aspect. The function may be implemented by hardware, or may be implemented by executing corresponding software by hardware. The hardware or the software includes one or more modules corresponding to the foregoing function.

In a possible design, a structure of the mobile edge computing device includes a processor and a transmitter. The processor is configured to support the mobile edge computing device in performing the corresponding function in the method according to the first aspect. The transmitter is configured to support communication between the mobile edge computing device and another device, and send to the another device information or an instruction included in the method according to the first aspect. The mobile edge computing device may further include a memory. The memory is configured to couple to the processor, and stores a program instruction and data that are necessary.

According to a fourth aspect, an embodiment of this application provides a network device. The network device has a function of implementing a behavior of the management device in the method according to the second aspect. The function may be implemented by hardware, or may be implemented by executing corresponding software by hardware. The hardware or the software includes one or more modules corresponding to the foregoing function.

In a possible design, a structure of the network device includes a processor and a transmitter. The processor is configured to support the network device in performing the corresponding function in the method according to the second aspect. The transmitter is configured to support communication between the network device and another device, and send to the another device information or an instruction included in the method according to the first aspect. The network device may further include a memory. The memory is configured to couple to the processor, and stores a program instruction and data that are necessary.

According to a fifth aspect, an embodiment of this application provides a capability exposure architecture. The architecture includes the mobile edge computing device according to the first aspect and the third aspect and/or the network device according to the second aspect and the fourth aspect.

According to a sixth aspect, an embodiment of this application provides a computer storage medium, configured to store a computer software instruction used to perform the function according to the first aspect, any design of the first aspect, and the second aspect, and includes a program designed to perform the method according to the first aspect, any design of the first aspect, and the second aspect.

According to a seventh aspect, an embodiment of this application provides a computer program product. The computer program product includes an instruction. When the instruction is executed on a computer, the computer is enabled to perform the method according to the first aspect, any design of the first aspect, and the second aspect.

According to an eighth aspect, an embodiment of this application further provides a chip system. The chip system includes a processor, configured to support a mobile edge computing device in implementing the method according to the first aspect or configured to support a network device in implementing the method according to the second aspect, for example, generating or processing data and/or information included in the foregoing methods. In a possible design, the chip system further includes a memory. The memory is configured to store a program instruction and data that are necessary to the mobile edge computing device or the network device. The chip system may include a chip, or may include a chip and another discrete device.

In the embodiments of this application, after the mobile edge computing device receives the service request, some or all services in the service request may be forwarded to another mobile edge computing device or the management device for processing. In this way, when a particular mobile edge computing device receives a large quantity of service requests, the service request may be forwarded to the management device or a relatively idle mobile edge computing device for processing, so that the plurality of mobile edge computing devices and the management device may collaboratively process the service requests, and resource utilization of the mobile edge computing device can be improved.

DESCRIPTION OF EMBODIMENTS

Figure 1:
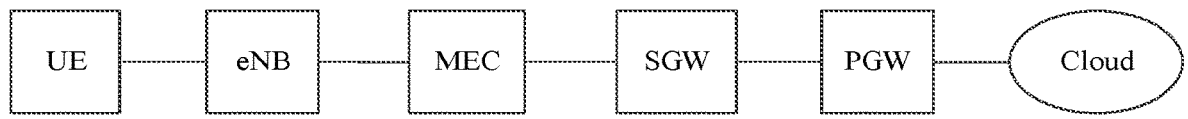
FIG. 1 is a schematic diagram of a capability exposure architecture in the prior art.

The following clearly and with more details describes the technical solutions in embodiments of this application with reference to the accompanying drawings in the embodiments of this application.

The embodiments of this application provide a service processing method. The method can be applied to a communications system, such as a 4G network or a 5G network, and can certainly be applied to another communications system such as a new radio (NR) system, a wireless fidelity (Wi-Fi) system, a worldwide interoperability for microwave access (WiMAX) system, a global system for mobile communications (GSM) system, a code division multiple access (CDMA) system, a wideband code division multiple access (WCDMA) system, a general packet radio service (GPRS), a Long Term Evolution (LTE) system, an advanced long term evolution (LTE-A) system, a universal mobile telecommunication system (UMTS), and a 3rd generation partnership project (3GPP)-related cellular system. The inter-system may be any two of the foregoing communications systems.

In addition, the method may further be applicable to a future-oriented communications technology. A system described in the embodiments of this application is used to describe the technical solutions of the embodiments of this application more clearly, and is not intended to limit the technical solutions provided in the embodiments of this application. A person of ordinary skill in the art may learn that, as a network architecture evolves, the technical solutions provided in the embodiments of this application are also applicable to similar technical problems.

In the following six paragraphs, some terms of the embodiments of this application are described, so as to help persons skilled in the art have a better understanding.

(1) A base station (Evolved Node B, eNB) may also be referred to as a network device, and may be a device that is in an access network and that communicates on an air interface with a wireless terminal device by using one or more cells. The base station may be configured to mutually convert a received over-the-air frame and an IP packet and serve as a router between the terminal device and a rest portion of the access network, where the rest portion of the access network may include an IP network. The base station may coordinate attribute management of the air interface. For example, the base station may include an evolved NodeB (NodeB or eNB or e-NodeB, evolutional Node B) in a long term evolution (LTE) system or an evolved LTE system (LTE-Advanced, LTE-A), or may include a next generation NodeB (gNB) in the 5G system. This is not limited in the embodiments of this application.

(2) A terminal device may be a device that provides a user with voice and/or data connectivity, for example, may be a handheld device with a wireless connection function, or a processing device connected to a wireless modem. The terminal device may communicate with a core network by using a radio access network (RAN), to exchange voice and/or data with the RAN. The terminal device may be referred to as user equipment (UE), a wireless terminal device, a mobile terminal device, a subscriber unit, a subscriber station, a mobile station, a mobile, a remote station, an access point (AP), a remote terminal, an access terminal, a user terminal, a user agent, a user device, or the like. For example, the terminal device may include a mobile phone (or referred to as a "cellular" phone), a computer having a mobile terminal device, a portable, a pocket-sized, a handheld, a computer-built-in, or an in-vehicle mobile apparatus, or an intelligent wearable device. For example, it may be a device such as a personal communication service (PCS) phone, a cordless telephone set, a session initiation protocol (SIP) phone, a wireless local loop (WLL) station, or a personal digital assistant (PDA), a smartwatch, a smart helmet, smart glasses, or a smart band. The terminal device further includes a restricted device such as a device with low power consumption, a device with a low storage capability, or a device with a low computing capability. For example, the terminal device includes an information sensing device, such as a barcode, radio frequency identification (RFID), a sensor, a global positioning system (GPS), or a laser scanner.

(3) A mobile edge computing device (MEC) is a device close to the base station, and can obtain a data packet of UE, process the data packet, and perform routing on a processing result, to provide a required service to the terminal device. In addition, third-party application integration may further be provided. In this case, the MEC device can route the data packet of the terminal device to a corresponding third-party application server and performs local processing. For example, load information and radio link quality information of an access network side are obtained on the MEC and are fed back to a content optimization unit for dynamic adjustment (mainly for video bitrate adjustment), so that user experience may be improved, and a latency and a stalling frequency can be reduced.

(4) A service gateway (SGW) is mainly responsible for data transmission, forwarding, and route switching of the terminal device, and is used as a local mobility anchor when the terminal device is handed over between the base stations.

(5) A packet data network gateway (PGW) is an entry for data sent by an external network to the terminal device, and is responsible for IP address allocating of the terminal device and data packet filtering, rate control, charging information generating, and the like of the terminal device. The terminal device may create a packet data network (PDN) connection by connecting to the PGW to access an external PDN network. The PDN networks may be the Internet, a virtual private network (VPN), an IP multi-media service (IMS) network, a wireless application protocol (WAP) network that is provided by an operator, or the like.

(6) The terms "system" and "network" may be used interchangeably in the embodiments of this application. A "plurality of" refers to two or more. In view of this, in the embodiments of this application, the "plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Figure 2:
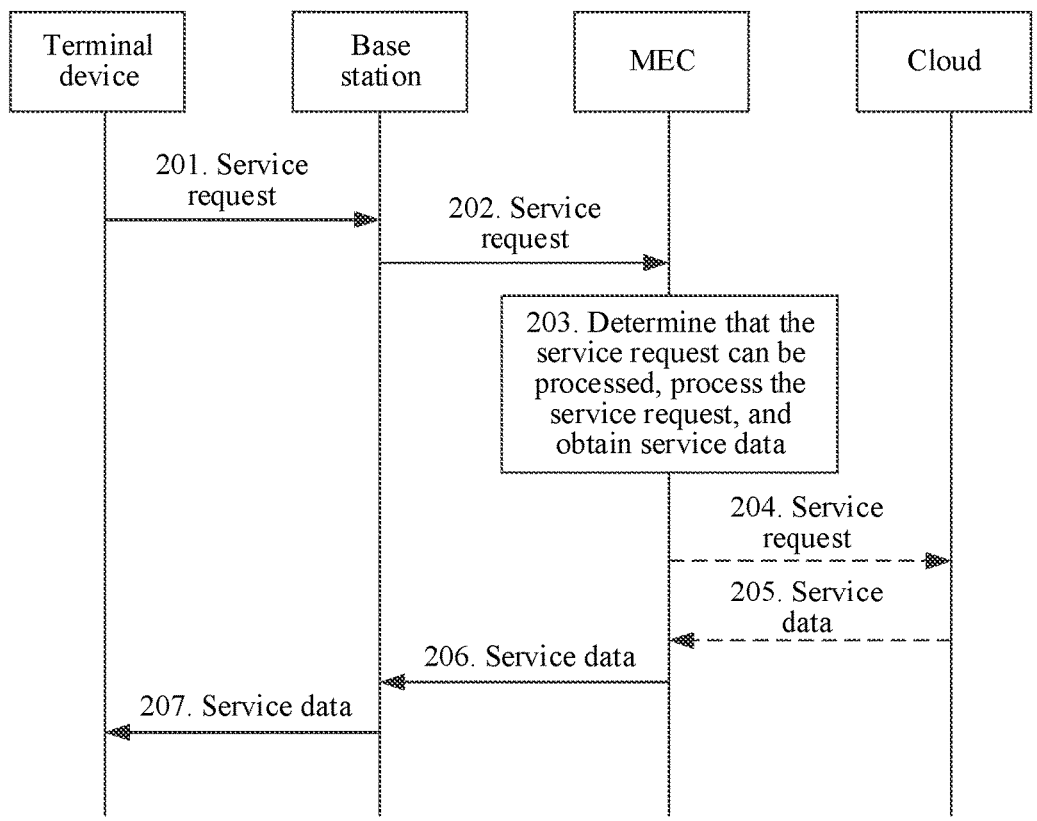
FIG. 2 is a flowchart of a service processing method in the prior art.

Currently, a capability exposure architecture in a communications system is mainly as shown in FIG. 1. In this scenario, a service processing procedure of the communications system is shown in FIG. 2.

Step 201: A terminal device sends a service request to a base station.

Step 202: The base station, after receiving the service request, forwards the service request to an MEC corresponding to an area in which the terminal device is located.

Step 203: The MEC determines whether the MEC can process the service request. If the MEC can process the service request, the service request is added to a request queue of the MEC to wait for processing. After the processing is completed, step 206 to step 207 are performed. If the MEC cannot process the service request, step 204 to step 207 are performed.

Step 204: The MEC determines that the service request cannot be processed, and sends, through an SGW and a PGW, the service request to a cloud for processing.

Step 205: The MEC receives service data corresponding to the service request from the cloud.

Step 206: The MEC feeds back the service data corresponding to the service request to the base station.

Step 207: The base station sends the service data corresponding to the service request to the terminal device, and completes processing on the service request.

In the foregoing technical solutions, because quantities of the terminal devices in coverage areas of the MECs are different, and service volumes of the terminal devices are different. As a result, quantities of the service requests that the MECs need to process are different. For example, at a particular moment, a quantity of service requests that an MEC1 needs to process is large, and a quantity of the service requests that an MEC2 needs to process is almost zero. In view of this, the service processing method in the prior art may cause low resource utilization of the MEC.

Figure 3:
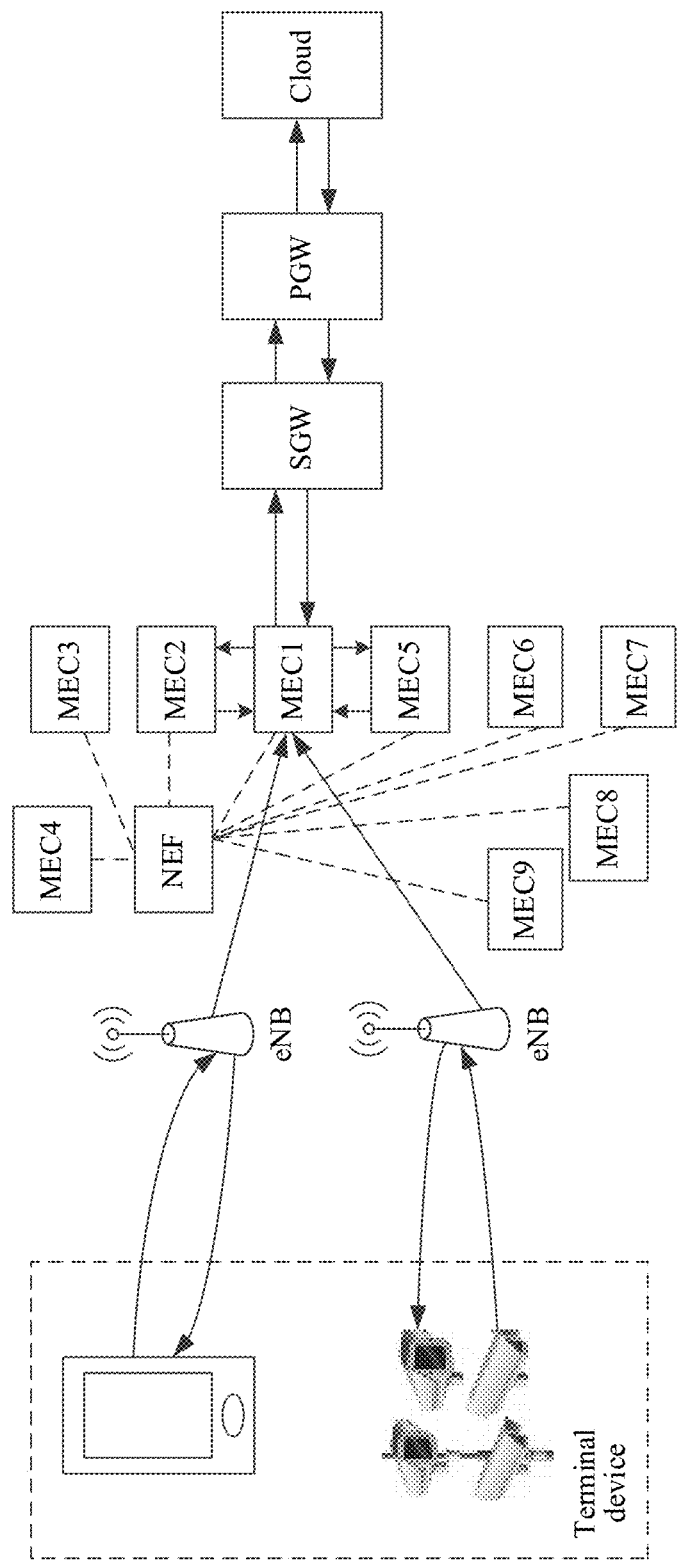
FIG. 3 is a schematic diagram of a capability exposure architecture according to an embodiment of this application.

In view of this, based on the capability exposure architecture shown in FIG. 3, the embodiments of this application provide a service processing method, to improve the resource utilization of the MEC.

As shown in FIG. 3, the embodiments of this application provide a capability exposure architecture. The capability exposure architecture includes at least one management device and a plurality of MECs. Each of the plurality of MECs is configured to perform analysis, matching, delivery, reconstruction, and processing on a service request of a terminal device, and buffer service data corresponding to the service request. The management device is mainly configured to identify and manage the plurality of MECs, including managing a node status and deployed service types of each MEC. The management device may be a network exposure function (NEF) device, or may be another device or control node that can manage the plurality of MECs. This is not limited herein. In the embodiments of this application, descriptions are made by using an example in which the management device is an NEF device.

As shown in FIG. 3, the capability exposure architecture may further include a plurality of base stations, and there may be preset correspondences between the plurality of base stations and the plurality of MECs. For example, there may be one-to-one correspondences between the plurality of base stations and the plurality of MECs. To be specific, each MEC manages a service request sent by one base station. Certainly, each base station may include a plurality of serving cells, and therefore, the preset correspondences between the plurality of base stations and the plurality of MECs may alternatively be correspondences between respective serving cells of the plurality of base stations and the MECs. For example, the base station includes 3 serving cells: a serving cell 1 to a serving cell 3. It may be set that the serving cell 1 and the serving cell 2 correspond to an MEC1 shown in FIG. 3, and the serving cell 3 corresponds to an MEC2 shown in FIG. 3. In this way, service requests sent by terminal devices from the serving cell 1 and the serving cell 2 are processed by the MEC1, and service requests sent by terminal devices from the serving cell 3 are processed by the MEC2. Certainly, other correspondences may be set between the plurality of base stations and the plurality of MECs. This is not limited herein.

Figure 4:
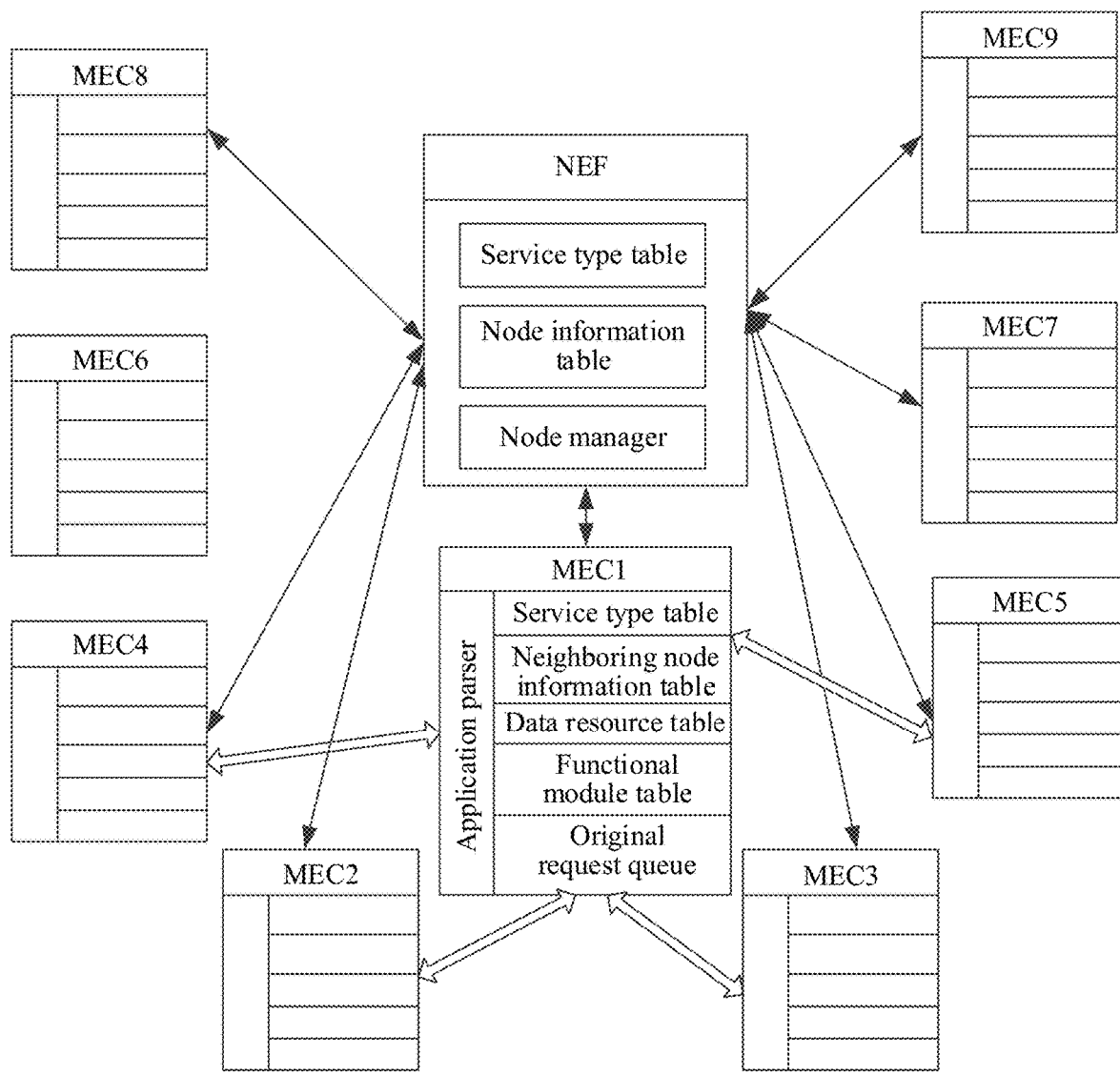
FIG. 4 is a schematic diagram of functional modules of a management device and an MEC in a capability exposure architecture according to an embodiment of this application.

For example, referring to FIG. 4, an application parsing module may be set in each MEC to analyze the service request of the terminal device, determine service types and a feature of the service request, extract key data of the service request, and so on. In addition, to accelerate a service processing procedure, a plurality of information tables, such as a service type table, a node information table, a data resource table, a functional module table, and an original request queue, may be set in each MEC. The service type table stores a deployed application service; the node information table stores status information, resource usage, existing service types, and the like of a neighboring device of the MEC; the data resource table is used to store a data resource, including sensed data from the terminal device, obtained service data, and a resource transmitted by a cloud; the original request queue is used to store a service request that is not parsed; and the functional module table is used to store a functional module that is currently deployed on the MEC. The service type table may be set in the NEF to store service types deployed on the NEF. The node information table is used to store node information of each of the plurality of MECs managed by the NEF, and the node information includes resource usage and the deployed service types of each MEC. Table 1 is identification symbols of the information tables and corresponding descriptions stored in each MEC and the NEF. For example, M_ID is a number of the MEC, and a value of M_ID is any integer in 1, 2, 3 . . . N, where N is a total quantity of the plurality of MECs managed by the NEF; and M_State is a current work state of the MEC, and a value of M_State may be 1 or 0. When M_State=1, it represents that the MEC is currently in a working state; and when M_State=0, it represents that the MEC is currently in a non-working state. If the identification symbol is another symbol, for corresponding descriptions, refer to Table 1. Examples are not provided herein again one by one.

TABLE 1

| Number | Type | Symbol | Name | Description |
|---|---|---|---|---|
| 1 | Static information and maintained tables of the MEC | MID | A number of the MEC | A value is 1, 2, 3 . . . |
| 2 | | M_State | A current work state of the MEC | A value is 1 or 0 |
| 3 | | M_Workload | A current load situation of the MEC | Describe usage of a current resource and a workload |
| 4 | | M_CoverArea | A geographic area covered by the MEC | A circular area with o as a center of the circle and r as a radius |
| 5 | | M_NeigNodeTable | A neighboring node information table of the MEC | Maintain information, including deployed service types, load situations, and coverage areas, of all neighboring nodes |
| 6 | | M_AppTypeTable | A service type table of the MEC | Store a deployed service, and record a name, a type, and a feature of the service |
| 7 | | M_ResourceTable | A data resource table of the MEC | A stored data resource, including a resource on a cloud, sensed data of a terminal, or an obtained service result |
| 8 | | M_ReqServiceTable | An original request table of the MEC | Store a service request that is from the terminal device and that is not parsed |
| | | M_FuncModTable | A functional module table of the MEC | A deployed functional module, configured for multi-node collaborative processing |
| 9 | Maintained tables of the NEF | N_MECTable | A node information table of the NEF | Manage information, including locations and areas, service types, load situations, and the like, of all MEC nodes |
| | | N_ReqServiceTable | An original request table of the NEF | Store the service request that is from the terminal device and that is not parsed |
| 10 | | N_AppTypeTable | A service type table of the NEF | A service type that has been deployed on the NEF |

As shown in FIG. 4, the NEF may interact with each MEC. For example, the MEC may send a query request to the NEF, so that the NEF, based on the query request, queries node status information, a deployed service type, and a current load situation of another MEC, and feeds back a query result to the MEC. In addition, the MECs may also interact with each other. For example, at least one neighboring device and at least one non-neighboring device are disposed for each MEC. The neighboring device and the non-neighboring device may be manually configured, or may be automatically determined by each MEC based on a preset rule, for example, determined based on a rule that a distance value is smaller than a threshold. This is not limited herein. For example, in FIG. 4, an MEC2 to an MEC5 are neighboring devices of an MEC1, and an MEC6 to an MEC9 are non-neighboring devices of the MEC2. In this case, the MEC1 may directly interact with any MEC in the MEC2 to the MEC5. For example, the MEC1 encapsulates a received service request into a new service request and sends the new service request to the MEC2; and the MEC2, after processing the new service request, feeds back service data to the MEC1. If the MEC1 needs to interact with any device in the MEC6 to the MEC9, for example, the MEC1 interacts with the MEC6, the MEC1 may first send a query request to the NEF, then the NEF feeds back node information of the MEC6 to the MEC1, and the MEC1 interacts with the MEC6 based on the node information fed back by the NEF. Certainly, other information exchanges may be performed among respective MECs and the NEF. For details, refer to Table 2. Examples are not provided herein again one by one.

TABLE 2

| 1 | Terminal device/MEC/NEF interaction information | Req_Type | A type of the service request | A type of the service request obtained by parsing the original service request |
|---|---|---|---|---|
| 2 | | Req_Feature | A feature of the service request | A feature of the service request obtained by parsing the original service request |
| 3 | | Req_Key Content | A request content in the service request | Describe a specific task requirement and a target of the service request |
| 4 | | Req_Service | The service request | Represent the original service request from UE |
| 5 | | Req_Result | A request result | Process the service request, to obtain a final service result |
| 6 | | Req_ServiceNew | A new service request | The service request that is re-encapsulated after being parsed |
| 7 | | Req_SubService | A sub service request | The original service request, after being parsed, is re-encapsulated into a plurality of different service requests |
| 8 | | Req_SubResult | A sub service result | A corresponding service result obtained by processing each sub service request |
| 9 | | Req_Query | A query request | Query for the node status, the deployed service, and the load situation |
| 10 | | Req_Collab | A collaboration request | Collaborative processing, where a keyword includes the feature and type of service, and a task target |

It should be noted that, the quantity of the NEFs and the quantity of the MECs included in the capability exposure architecture shown in FIG. 3 are merely an example, and the embodiments of this application are not limited thereto. For example, more NEFs or more MECs may be included. For brief descriptions, this is not described one by on in the accompanying drawings. In addition, in the capability exposure architecture shown in FIG. 3, although the terminal device, the base station, the NEF, the MEC1 to the MEC9, the SGW, the PGW, and the cloud are depicted, the capability exposure architecture may include, but is not limited to, the terminal device, the base station, the NEF, the MEC1 to the MEC9, the SGW, the PGW, and the cloud. For example, the capability exposure architecture may further include a core network device, a device configured to bear a virtualized network function, or the like. This is obvious to a person of ordinary skill in the art. Examples are not provided herein gain one by one.

Further, contents and quantities of functional modules disposed in the MEC and the NEF shown in FIG. 4, contents and quantities of various information tables shown in Table 1, and contents and quantities of interaction information in Table 2 are also merely an example. A person of ordinary skill in the art may set functional modules, information tables, and interaction information that have other contents or quantities, and the embodiments of this application is not limited thereto.

Because the service processing method in the prior art causes low resource utilization of the MEC, in the service processing method provided in the embodiments of this application based on the capability exposure architecture shown in FIG. 3, a first mobile edge computing device, after receiving a first service request that includes a service type and/or service content, may send a second service request to a second mobile edge computing device, where the second service request includes at least part of the service type and/or at least part of the service content, and identification information of the first mobile edge computing device; and finally receive service data corresponding to the second service request from the second mobile edge computing device.

In the foregoing technical solutions, after the mobile edge computing device receives the service request, some or all services in the service request may be forwarded to another mobile edge computing device for processing. In this way, when a particular mobile edge computing device receives a large quantity of service requests, the service request may be forwarded to a relatively idle mobile edge computing device for processing, so that the plurality of mobile edge computing devices may collaboratively process the service requests, and resource utilization of the mobile edge computing device can be improved.

The following describes the technical solutions provided in the embodiments of this application with reference to the accompanying drawings. In the following description process, an example in which the technical solutions provided in this application is applied to the capability exposure architecture shown in FIG. 3, the management device is the NEF, the terminal device is UE, the first MEC is an MEC, such as the MEC1, that is in the plurality of MECs shown in FIG. 3 and that is configured to process a service request corresponding to the UE, and interaction information between respective devices in the capability exposure architecture is the information shown in Table 1 and Table 2 is used.

Figure 5A:
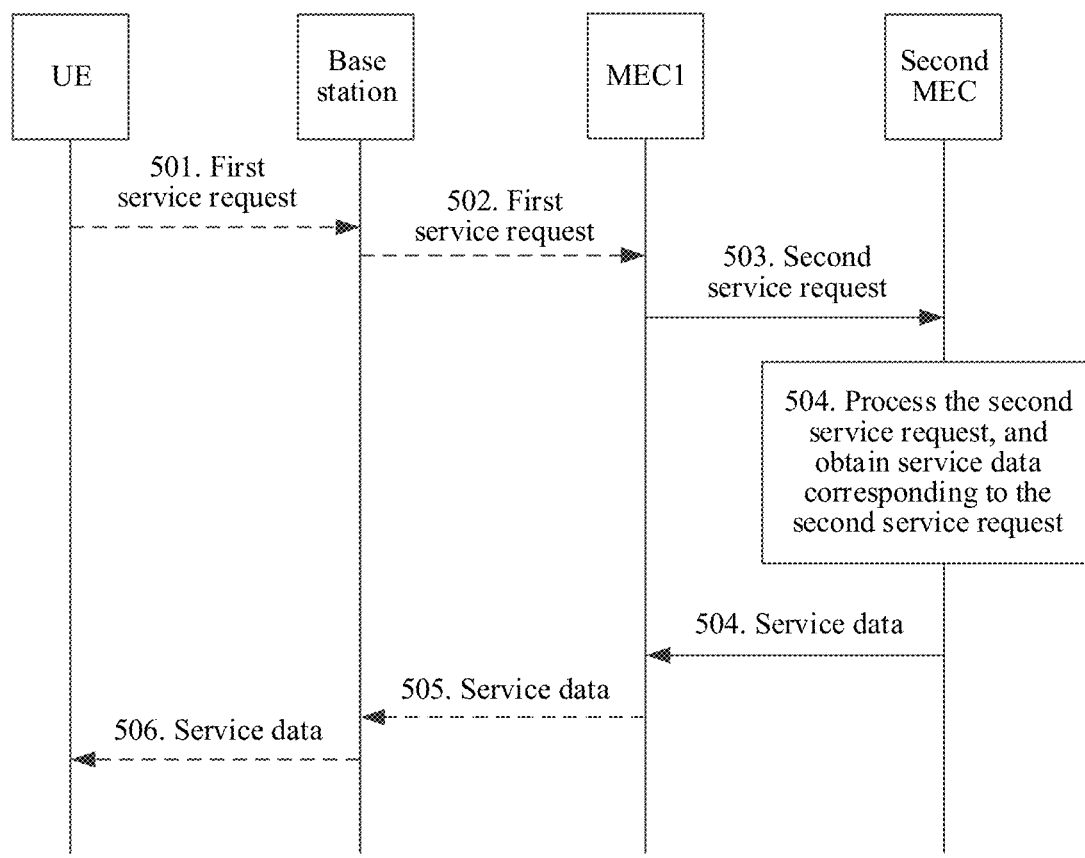
FIG. 5A to FIG. 5B are flowcharts of a service processing method according to an embodiment of this application.
Figure 5B:
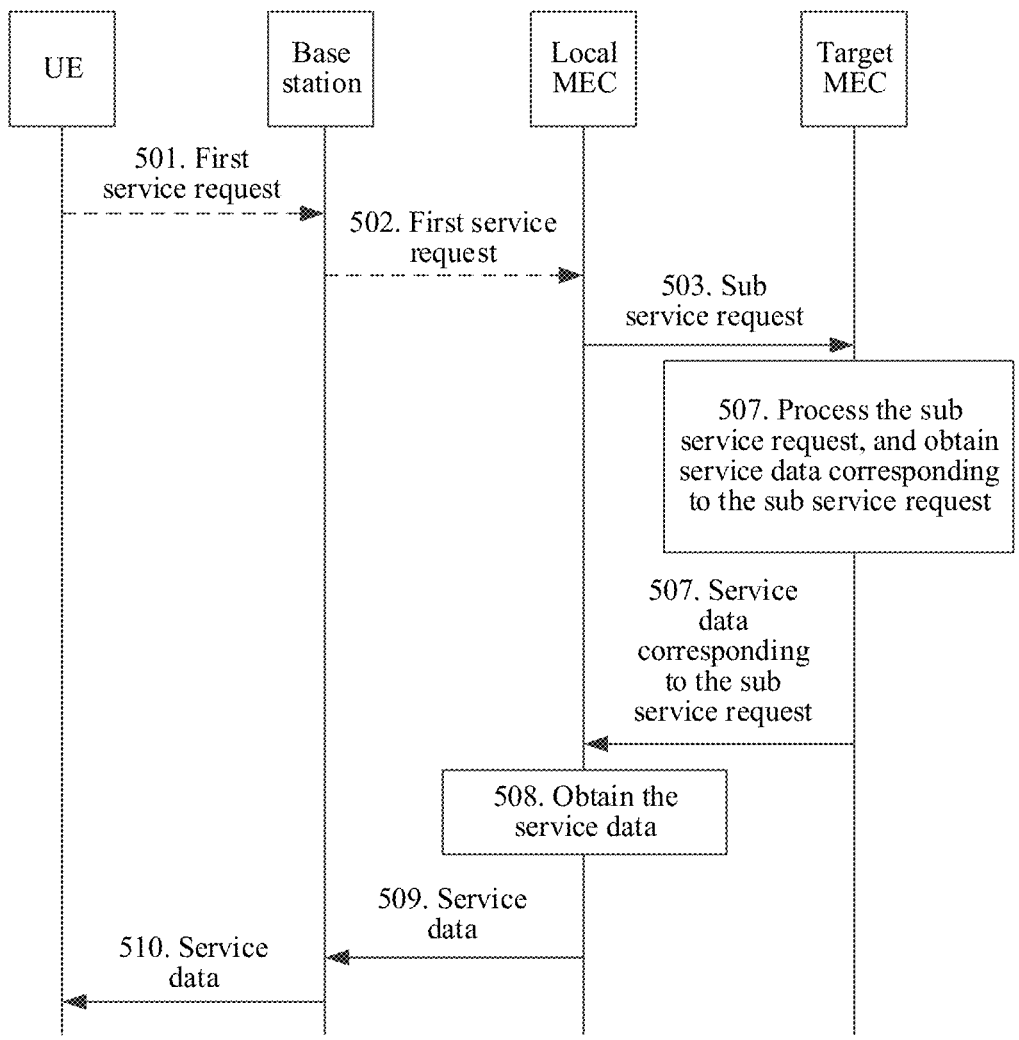

FIG. 5A to FIG. 5B are flowcharts of a service processing method according to an embodiment of this application. Procedure descriptions of the method are as follows:

Step 501: UE sends a first service request to a base station.

In this embodiment of this application, the first service request may be a pure computing request such as a request for online translation; or may be a pure storage request such as a request for network storage; or may alternatively be a computing and storage integrated request such as a request for navigation or a request for playing an online game. This is not limited herein. The following descriptions are made by using an example in which the first service request is a service request Req_Service.

Step 502: The base station receives the first service request and sends the first service request to the MEC1.

In this embodiment of this application, correspondences between respective serving cells of the base station and the MECs may be pre-stored in a storage unit of the base station. For example, the base station includes 3 serving cells: a serving cell 1, a serving cell 2, and a serving cell 3. An MEC corresponding to the serving cell 1 and the serving cell 2 is the MEC1 in FIG. 3, and an MEC corresponding to the serving cell 3 is the MEC2 in FIG. 3. The base station, after receiving the service request Req_Request sent by the UE, first determines a serving cell at which the UE is located, for example, the serving cell at which the UE is located is the serving cell 2, determines that an MEC corresponding to the UE is MEC1, and then, sends the service request Req_Service to the MEC1.

Certainly, the storage unit of the base station may directly store identification information of an MEC corresponding to the base station. For example, if the MEC identification information stored in the base station is the MEC1, UE in all the serving cells of the base station corresponds to the MEC1, and the base station directly sends the service request to the MEC1 provided that the base station receives the service request of the UE. Certainly, the base station may further determine to send the service request to the MEC1 in another manner. For example, the base station may directly send the service request to an MEC closest to the base station. This is not limited herein.

It should be noted that, step 501 and step 502 are not necessary. To be specific, step 501 and step 502 may be skipped. For example, if the service request is sent by a third-party application instead of the UE. In this case, step 501 and step 502 are skipped.

Step 503: The MEC1 sends a second service request to a second MEC.

In this embodiment of this application, the second service request includes at least part of the service type of the first service request and/or at least part of the service content of the first service request, and identification information of the first mobile edge computing device.

In a specific implementation process of step 503, specifically, the second service request may be sent by selecting any one of the following four sending manners.

First sending manner: The MEC1 pre-stores identification information of the second MEC, for example, stores a number M_3 of the second MEC, so that the MEC1, after receiving the service request Req_Service, directly sends the second service request corresponding to the service request Req_Service to an MEC3.

Second sending manner: The MEC1 first determines the second MEC based on an information list of mobile edge computing devices, and then sends the second service request to the second MEC.

In this sending manner, the information list of mobile edge computing devices includes identification information of at least one mobile edge computing device, such as the number of the second MEC; or the information list of mobile edge computing devices includes the identification information of the at least one mobile edge computing device and a service type and/or service content deployed on the corresponding mobile edge computing device. For example, the MEC1 may include a number of each MEC in the MEC2 to the MEC5 and service types deployed on each MEC and/or service contents in a resource data table of each MEC. The information list of mobile edge computing devices may be set in the MEC1, for example, may be a neighboring node information table M_NeigNodeTable of the MEC in Table 1; or may be set in the NEF, for example, may be the node information table N_MECTable of the NEF in Table 1. Certainly, the information list of mobile edge computing devices may alternatively be a list of another type. The information list of mobile edge computing devices may include one or more of the foregoing lists. This is not limited herein. For example, in the following descriptions, the descriptions may be made by using an example in which the information list of the mobile edge computing devices is respectively the neighboring node information table M_NeigNodeTable of the MEC and the node information table N_MECTable of the NEF.

When the information list of mobile edge computing devices is the neighboring node information table M_NeigNodeTable of the MEC, the MEC1 may determine the second MEC by querying the neighboring node information table M_NeigNodeTable of the MEC1; and when the information list of mobile edge computing devices is the node information table N_MECTable of the NEF, the MEC1 sends a query request to the NEF, and the NEF feeds back, after determining the second MEC by querying the node information table N_MECTable of the NEF, node information of the second MEC to the MEC1, so that the MEC1 can determine the second MEC based on the node information fed back by the NEF.

Third sending manner: The MEC1, after receiving the service request Req_Service, first determines, based on a service type and/or service content deployed on the MEC1, that the second service request needs to be sent to the second MEC, and then sends to the MEC3 the second service request corresponding to the service request Req_Service based on the second MEC identification information pre-stored in the MEC1, for example, the stored number M_3 of the second MEC.

For example, the MEC1 may parse, after receiving the service request Req_Service, the service request, determine a service type Req_Type and a request content Req_KeyContent of the service request Req_Service, and then determine whether the second service request needs to be sent to the second MEC. For example, it may be determined whether the service types deployed on the MEC1 include the service type Req_Type and/or whether the resource data table of the MEC1 includes service data the same as the request content Req_KeyContent. If a determining result is negative, the MEC1 determines that the second service request needs to be sent to the second MEC, and the MEC1 sends to the MEC3 the second service request corresponding to the service request Req_Service.

Fourth sending manner: The MEC1, after receiving the service request Req_Service, first determines, based on a service type and/or service content deployed on the MEC1, that the second service request needs to be sent to the second MEC, and the MEC1 then determines the second MEC based on the information list of mobile edge computing devices and finally sends the second service request to the second MEC.

In the sending manner, a method of determining, by the MEC1 based on a service type and/or service content deployed on the MEC1, that the second service request needs to be sent to the second MEC is the same as a determining method in the third manner; and a method of determining, by the MEC1, the second MEC based on the information list of mobile edge computing devices is the same as a determining method in the second manner. Details are not described herein again.

It should be noted that, there may be one or more second MECs. This is not limited in this embodiment of this application.

In the foregoing four sending manners, an implementation process of the first sending manner is relatively simple. Details are not described again in the following descriptions. Because the fourth sending manner includes main steps in the second sending manner and the third sending manner, the following describes only the implementation process of the fourth sending manner in detail. For the implementation processes of the second sending manner and the third sending manner, refer to descriptions of corresponding steps in the fourth sending manner. Details are not described again in this embodiment of this application.

Figure 6A:
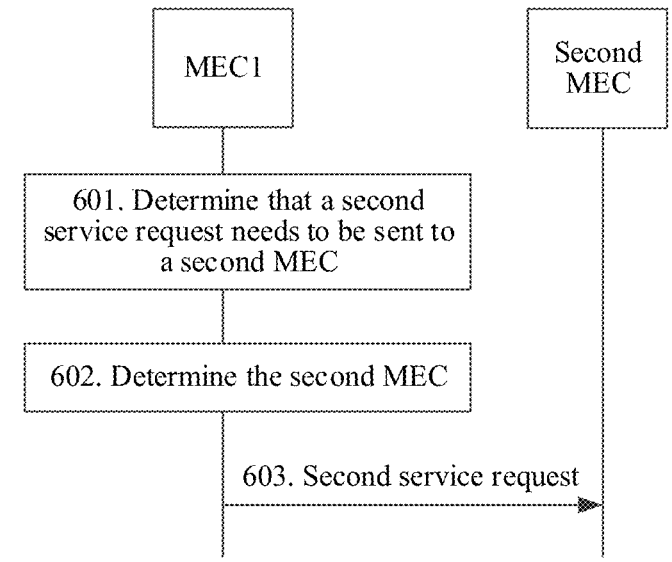
FIG. 6A to FIG. 6B are flowcharts of a specific implementation process of a fourth sending manner of step 503 according to an embodiment of this application when the service processing method shown in FIG. 5A is used.
Figure 6B:
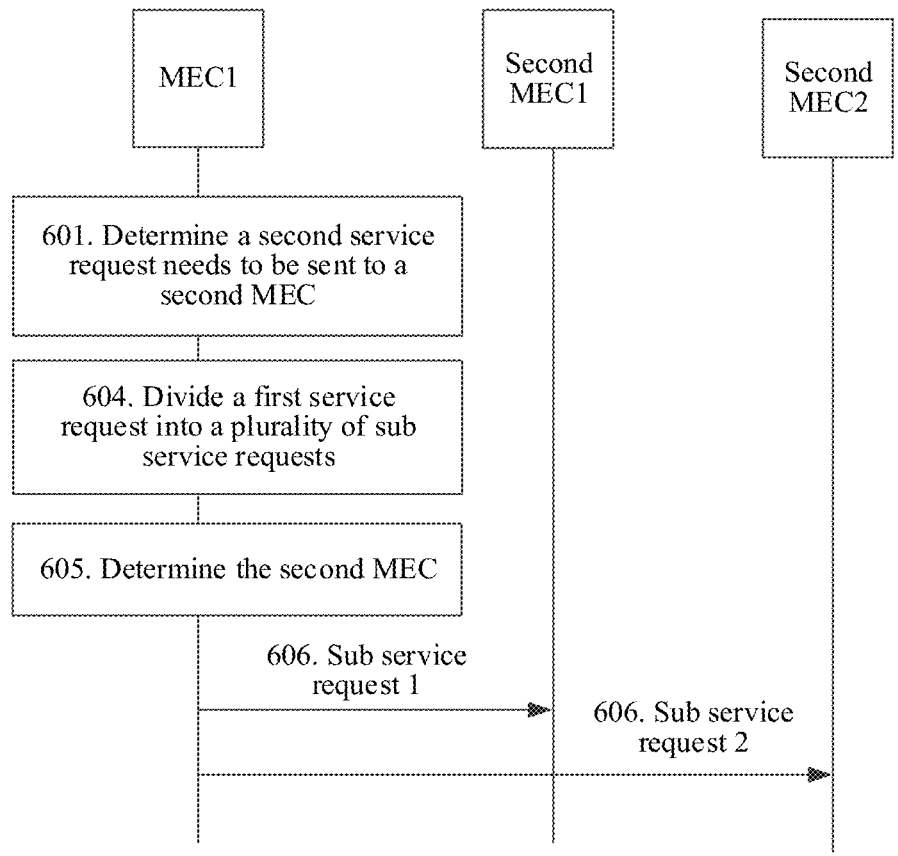

FIG. 6A to FIG. 6B are flowcharts of a specific implementation process of the fourth sending manner. Specific steps are as follows:

Step 601: The MEC1 receives and parses the service request Req_Service, and determines that the second service request needs to be sent to the second MEC.

In the specific implementation process, the MEC1, after receiving the service request Req_Service, first parses the service request Req_Service, determines the service type Req_Type of the service request Req_Service, extracts the request content Req_KeyContent, and at the same time, stores the service request Req_Service in an original request queue M_ReqServiceTable; and then determines, based on one or more factors in the service type Req_Type and the request content Req_KeyContent of the service request Req_Service and a current load situation M_Workload, that the second service request needs to be sent to the second MEC. For example, whether the service types deployed on the MEC1 include the service type Req_Type is determined, and if the service types deployed on the MEC1 do not include the service type Req_Type, the MEC1 determines that the second service request needs to be sent to the second MEC; or if the MEC1 determines, based on the current load situation M_Workload, that a service volume processed by the MEC1 has reached a maximum value, the MEC1 determines that the second service request needs to be sent to the second MEC. Certainly, there may further be another determining manner. This is not limited herein.

In the specific implementation process, different service requests may need different processing procedures. In this embodiment of this application, the MEC1, after parsing the received service request Req_Service, may determine a processing procedure required by the service request Req_Service needs, and then determine, based on the processing procedure that the service request needs, whether the second service request needs to be sent to the second MEC. The determining, based on the processing procedure that the service request needs, whether the second service request needs to be sent to the second MEC may include the following three cases:

First case: The service request may be processed by one MEC alone.

For example, if the MEC1, after parsing the service request Req_Service, determines, based on the service type of the service request Req_Service, that the service request Req_Service is a pure computing request for online translation, the MEC1 may comprehensively determine, by querying a service type table M_AppTypeTable or a data resource table M_ResourceTable based on the current load situation M_Workload, that the second service request needs to be sent to the second MEC. For example, the MEC1 determines whether the service type table M_AppTypeTable includes a service type matching the service type Req_Type. If the service type table M_AppTypeTable includes the service type matching the service type Req_Type, the MEC1 determines that the second service request does not need to be sent to the second MEC; otherwise, the MEC1 determines that the second service request needs to be sent to the second MEC. Alternatively, the MEC1 determines whether the data resource table M_ResourceTable stores data the same as the request content Req_KeyContent. If the data resource table M_ResourceTable stores the data the same as the request content Req_KeyContent, the MEC1 determines that the second service request does not need to be sent to the second MEC; otherwise, the MEC1 determines that the second service request needs to be sent to the second MEC. Alternatively, the MEC1 may also determine whether a current load volume of the MEC1 has reached a preset upper limit. If the current load volume does not reach the preset upper limit, the MEC1 determines that the second service request does not need to be sent to the second MEC; otherwise, the MEC1 determines that the second service request needs to be sent to the second MEC. Certainly, determining may be performed with reference to a combination of the foregoing three factors.

It should be noted that, in this case, the second service request includes all the service types of the service request Req_Service and/or all the service contents of the service request Req_Service, and a number of the MEC1.

Second case: The service request needs to be collaboratively processed by a plurality of MECs. All of the plurality of MECs that perform collaborative processing provide a same service type.

For example, the service request Req_Service is a road congestion situation query. The MEC1, after parsing the service request Req_Service, determines, based on a service content of the service request Req_Service, that one MEC cannot complete processing alone, a queried route includes a plurality of MECs, and therefore, all the MECs on the queried route need to collaborate, to obtain a congestion situation of the entire road. In this case, the MEC1 determines that the second service request needs to be sent to the second MEC.

It should be noted that, the MEC1 may further determine whether itself is on the route queried by the service request Req_Service, thereby determining the content included in the second service request. For example, if the MEC1 is on the queried route, the MEC1 determines that the second service request includes part of the service type of the service request Req_Service and/or part of the service content of the service request Req_Service, and the number of the MEC1; and if the MEC1 is not on the queried route, the MEC1 determines that the second service request includes all of the service types of the service request Req_Service and/or all of the service contents of the service request Req_Service, and the number of the MEC1.

It should be noted that, in this case, the second service request may be a plurality of sub service requests. Each sub service request is processed by the MEC, and each sub service request includes a service type and/or a service content of the sub service request, and the number of the MEC1.

Third case: The request content of the service request needs to be divided into a plurality of independent service requests for processing.

For example, the service request Req_Service is a service request for tour guiding, and tour guiding information may include a route, shopping, and a parking space in a tourist attraction. Therefore, the MEC1, after parsing the service request Req_Service, determines, based on the service types and the service contents of the service request Req_Service, that the service request Req_Service may be divided into: a query request for a route in the tourist attraction, a query request for shopping in the tourist attraction, and a query request of a parking space in the tourist attraction. In this way, the service request Req_Service is divided into a plurality of sub service requests. For different sub service requests, different MECs may be requested for processing, so that a speed of processing the service request by the capability exposure architecture is increased, and a service delay is reduced. In this case, the MEC1 may determine, respectively for the three sub service requests, whether the second service request needs to be sent to the second MEC. If the MEC1 can process the three sub service requests, the MEC1 determines that the second service request does not need to be sent to the second MEC; and if the MEC1 can process only one or two of the three sub service requests, the MEC1 determines that the second service request needs to be sent to the second MEC, and in this case, the second service request includes part of the service type of the service request Req_Service and/or part of the service content of the service request Req_Service, and the number of the MEC1. For a manner of performing determining for each sub service request, refer to the manner of performing determining for the service request Req_Service by the MEC1 in the first case. Details are not described herein again.

It should be noted that, in this case, the second service request may be the plurality of sub service requests. Each sub service request is processed by the MEC, and each sub service request includes a service type and/or a service content of the sub service request, and the number of the MEC1.

The following separately describes the foregoing three cases.

For the first case, refer to FIG. 6A. The specific implementation process of the fourth sending manner is as follows. After performing step 601, step 602 and step 603 are performed.

Step 602: The MEC1 determines the second MEC in other MECs.

In this embodiment of this application, a specific implementation of step 602 includes the following two manners.

Figure 7:
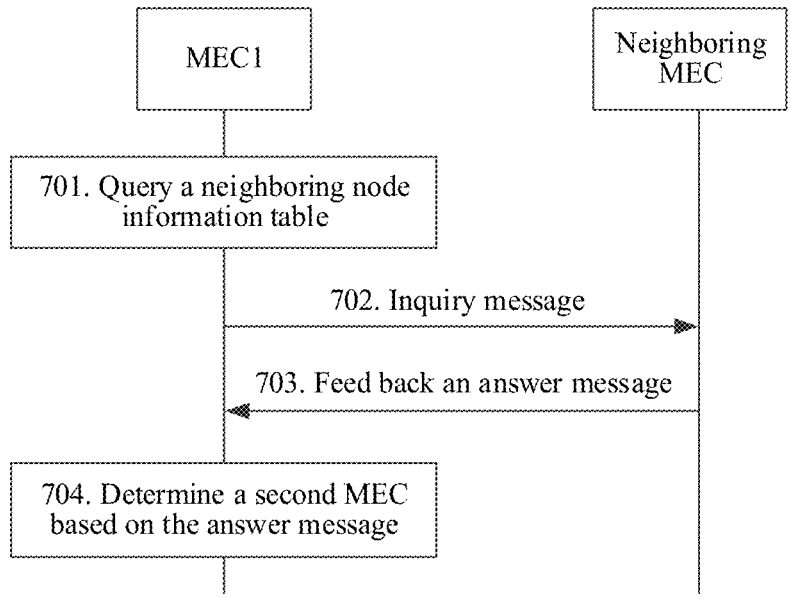
FIG. 7 is a flowchart of determining a second MEC by using a neighboring node information table according to an embodiment of this application when the service processing method shown in FIG. 5A is used.

In a first determining manner, the second MEC is determined by using the neighboring node information table M_NeigNodeTable. Referring to FIG. 7, a manner A includes:

Step 701: The MEC1 queries the neighboring node information table M_NeigNodeTable and determines a neighboring device that can process the service request.

In the specific implementation process, the MEC1 queries for a keyword in the neighboring node information table M_NeigNodeTable, where the keyword includes at least the service type Req_Type and/or the request content Req_KeyContent of the service request Req_Service, to search for node information of a neighboring MEC matching the keyword. Specifically, the neighboring node information table M_NeigNodeTable may be queried for a neighboring MEC on which the service type Req_Type is deployed and/or the request content Req_KeyContent is stored.

For example, using an example in which the keyword is the service type Req_Type, the MEC1 determines that the service type Req_Type is deployed on the MEC2 and the MEC3, and determines that the MEC2 and the MEC3 are the neighboring devices that can process the service request.

Step 702: The MEC1 sends an inquiry message to the neighboring device that can process the service request.

In this embodiment of this application, the inquiry message includes the service type of the service request and/or the request content of the service request.

When the MEC1 determines that the MEC2 and the MEC3 are the neighboring devices that can process the service request Req_Service, the MEC1 sends the inquiry information that carries the service type Req_Type and/or the request content Req_KeyContent to the MEC2 and the MEC3. It should be noted that, in this embodiment of this application, a name of the inquiry information is not limited.

Step 703: The neighboring device that can process the service request feeds back an answer message to the MEC1.

After the MEC2 and the MEC3 receive the inquiry message sent by the MEC1, the MEC2 and the MEC3 respectively query deployed service types and current load situations thereof, and determine whether the service request Req_Service can be processed. For the determining process, refer to step 601. Details are not described herein again. For example, the MEC2 determines that the MEC2 can process the service request Req_Service, and sends an acknowledgment message to the MEC1; and the MEC3 determines that the MEC3 cannot process the service request Req_Service, and sends a rejection message to the MEC1. Specific forms and contents of the acknowledgment message and the rejection message are not limited herein.

Step 704: The MEC1 determines the second MEC based on the answer message.

In the received answer messages, the MEC1 determines a neighboring MEC that feeds back the acknowledgment message as the second MEC. For example, the MEC1 determines the MEC2 as the second MEC. Certainly, if a plurality of neighboring MECs feed back acknowledgment messages, the MEC1 may select one from them as the second MEC based on a preset selection rule. The preset rule may be selecting a closest one or the like. This is not limited herein.

Figure 8:
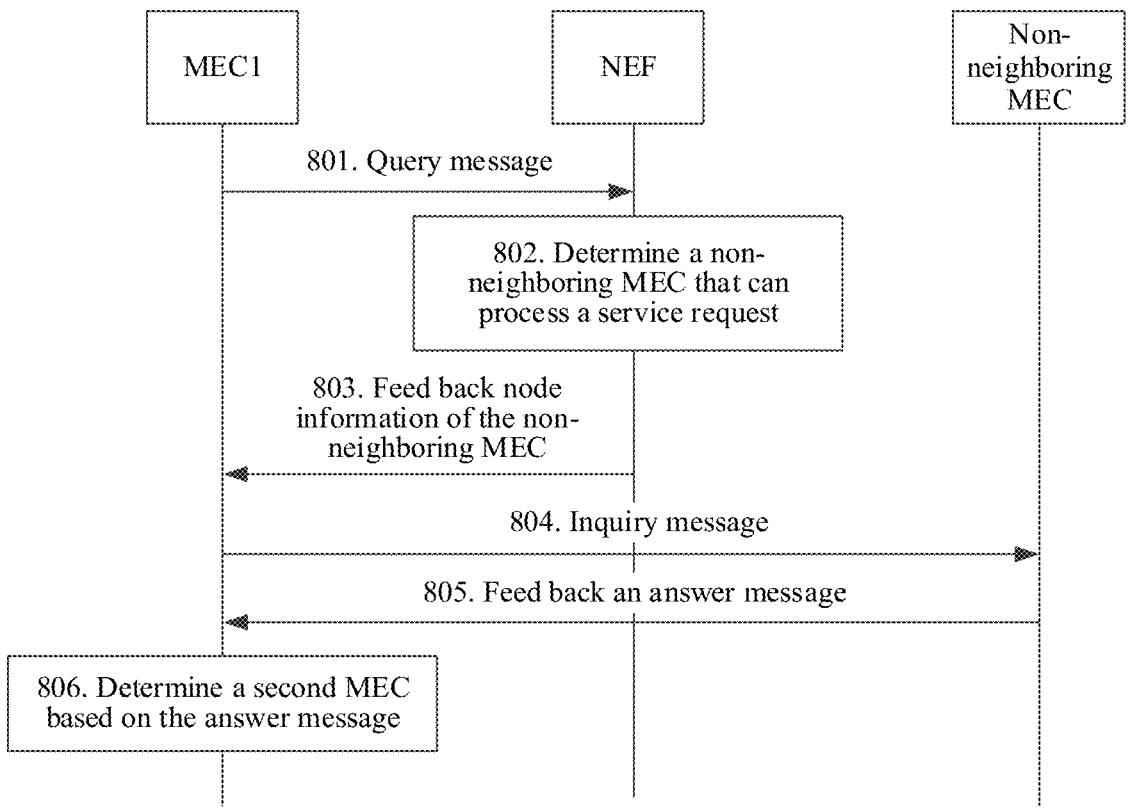
FIG. 8 is a flowchart of determining a second MEC by using a node information table in an NEF according to an embodiment of this application when the service processing method shown in FIG. 5A is used.

In a second determining manner, the second MEC is determined by using the node information table N_MECTable in the NEF. Referring to FIG. 8, a manner B includes:

Step 801: The MEC1 sends the query information to the NEF.

In this embodiment of this application, the query information includes at least the service types Req_Type and/or the request contents Req_KeyContent of the service request Req_Service.

Step 802: The NEF determines, based on the query information, a non-neighboring device that can process the service request. The non-neighboring device is a non-neighboring MEC of the MEC1.

In the specific implementation process, the NEF, after receiving the query message, queries for a keyword in the node information table N_MECTable, where the keyword includes at least the service type Req_Type and/or the request content Req_KeyContent of the service request Req_Service, to search for node information of a non-neighboring MEC matching the keyword. Specifically, the node information table N_MECTable may be searched for a non-neighboring MEC on which the service type Req_Type is deployed on and/or that the request content Req_KeyContent is stored.

For example, using an example in which the keyword is the service type Req_Type, the NEF determines that the service type Req_Type is deployed on the MEC6 and the MEC7, and determines that the MEC6 and the MEC7 are the non-neighboring devices that can process the service request.

Step 803: The NEF sends the node information of the non-neighboring device that can process the service request to the MEC1.

In a specific implementation process, the NEF may send a number of the non-neighboring device that can process the service request to the MEC1. For example, M_6 and M_7 are sent to the MEC1.

Step 804: The MEC1 receives the node information, and sends the inquiry message to an MEC corresponding to the node information.

In this embodiment of this application, the inquiry message includes the service type of the service request and/or the request content of the service request.

The MEC1 sends, after receiving M_6 and M_7 sent by the NEF, the inquiry information that carries the service type Req_Type and/or the request content Req_KeyContent to the MEC6 and the MEC7. It should be noted that, in this embodiment of this application, the name of the inquiry information is not limited.

Step 805: The non-neighboring device that can process the service request feeds back an answer message to the MEC1.

After the MEC6 and the MEC7 receive the inquiry message sent by the MEC1, the MEC6 and the MEC7 respectively query deployed service types and current load situations thereof, determine whether the service request Req_Service can be processed, and feed back answer information to the MEC1. This step is the same as step 703, and details are not described herein again.

Step 806: The MEC1 determines the second MEC based on the answer message.

In the received answer messages, the MEC1 determines a non-neighboring MEC that feeds back the acknowledgment message as the second MEC. This step is the same as step 704, and details are not described herein again.

In the specific implementation process, the MEC1 may determine the second MEC by using either of the foregoing two manners. Certainly, the foregoing two manners may be combined, to determine the second MEC. That is, the second MEC is first determined in the neighboring MECs in a manner A, and if the neighboring MECs cannot process the service request, the second MEC is determined in the non-neighboring MECs in a manner B.

After step 602 is performed, the MEC1 determines the second MEC, and then step 603 is performed.

Step 603: The MEC1 sends the second service request to the second MEC.

The MEC1, after determining the second MEC, generates the second service request by using the service type Req_Type and/or the request content Req_KeyContent of the service request Req_Service, and the identification information of the MEC1, and then sends the second service request to the second MEC.

In a manner of re-encapsulating the service request, sources of a plurality of service requests can be distinguished, and another MEC can be prevented from parsing the service request again, thereby increasing processing and responding speeds of the MEC.

By performing the foregoing steps, the MEC1 completes step 503. Referring to FIG. 5A, the MEC1, after completing step 503, performs step 504 to step 506.

Step 504: The second MEC processes the second service request, and sends service data corresponding to the second service request to the MEC1.

The second MEC, after receiving the second service request, processes the second service request, to obtain a service result Req_Result, and sends the service result Req_Result to the MEC1. The service result Req_Result is the service data corresponding to the second service request.

Step 505: The MEC1 receives the service data corresponding to the second service request, and feeds back the service data to the base station.

Step 506: The base station feeds back the service data to the UE.

Certainly, if the service request is initiated by a third-party application, step 505 and step 506 are skipped, and the MEC1 directly feeds back the service data to the third-party application. That is, step 505 and step 506 are not necessary.

It should be noted that, if the MEC1 determines that the second service request does not need to be sent to the second MEC, the MEC1 directly processes the service request Req_Service, to obtain the service result Req_Result, where the service result Req_Result is the service data corresponding to the service request Req_Service, and feeds back the service result Req_Result to the UE or the third-party application. Details are not described herein again.

For the second case and the third case, refer to FIG. 6B. The specific implementation process of the fourth sending manner is as follows. After performing step 601, step 604 to step 606 are performed.

Step 604: The MEC1 determines that the MEC1 can process only some services of the service request, and re-encapsulates the remaining services that cannot be processed into a plurality of sub service requests.

In this embodiment of this application, the number M_ID of the MEC1 and a service type Req_Type of each sub request are used as service identifiers of the sub service request Req_SubService.

For example, the route queried by the service request Req_Service may be divided into 3 road segments, where the MEC1 covers only a road segment 1. Therefore, the MEC1 encapsulates a road congestion situation query of a road segment 2 into a sub service request 1, and encapsulates a road congestion situation query of a road segment 3 into a sub service request 2. Certainly, the road congestion situation query of the road segment 2 and the road congestion situation query of the road segment 3 may be encapsulated in one sub service request. This is not limited herein.

The following descriptions are made by using an example in which the MEC1 encapsulates the road congestion situation query of the road segment 2 into the sub service request 1 and encapsulates the road congestion situation query of the road segment 3 into the sub service request 2.

Step 605: Determine, in the other MECs, the second MEC configured to process the plurality of sub service requests.

In this embodiment of this application, there are a plurality of second MECs. A specific implementation of step 605 may include the following two manners.

Figure 9:
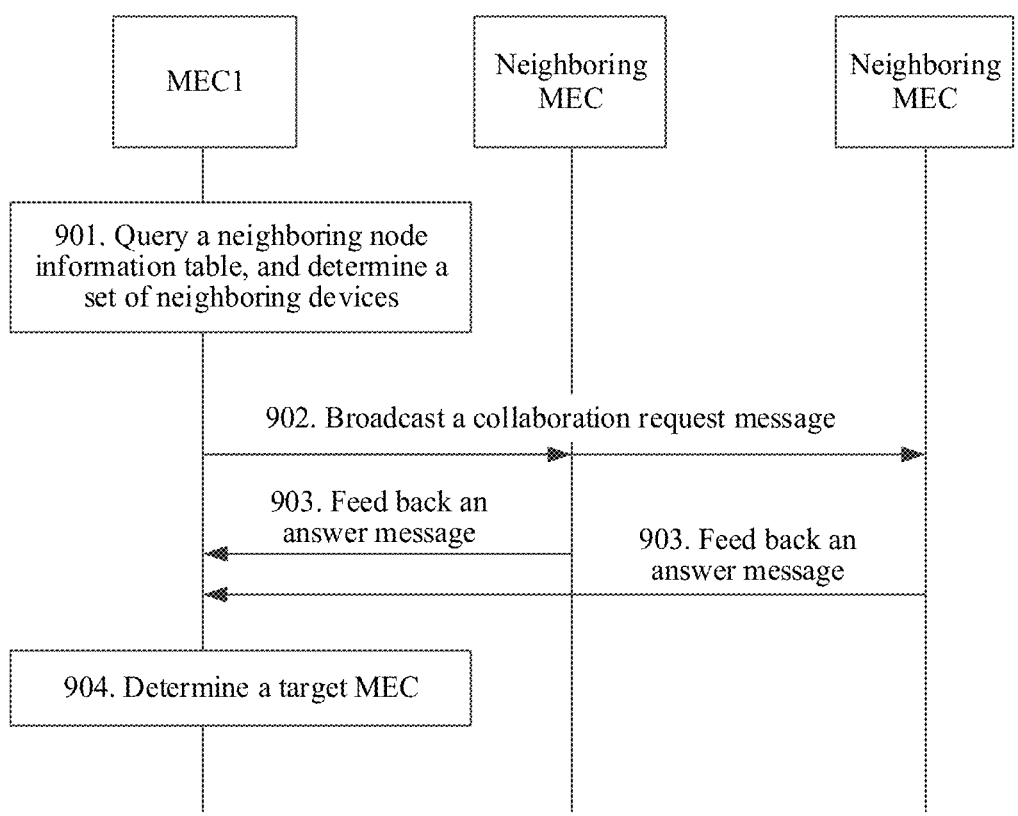
FIG. 9 is a flowchart of determining a second MEC by using a neighboring node information table according to an embodiment of this application when the service processing method shown in FIG. 5B is used.

In a manner A, the second MEC is determined by using the neighboring node information table M_NeigNodeTable. Referring to FIG. 9, the manner A includes:

Step 901: The MEC1 queries the neighboring node information table M_NeigNodeTable and determines a set of neighboring devices that can process the plurality of sub service requests.

A specific implementation step of step 901 is the same as that of step 701. Details are not described herein again.

For example, by performing step 901, the MEC1 determines the set of neighboring devices that can process the plurality of sub service requests is the MEC2 to the MEC5.

Step 902: The MEC1 broadcasts a collaboration request message to the set that of neighboring devices can process the plurality of sub service requests.

In this embodiment of this application, the collaboration request message includes the service types of respective sub service requests and/or the request contents of respective sub service requests.

It should be noted that, in this embodiment of this application, the name of the collaboration request message is not limited.

Step 903: Each neighboring device in the set of neighboring devices that can process the plurality of sub service request feeds back an answer message to the MEC1.

After the MEC2 to the MEC5 receive the collaboration request message, the MEC2 to the MEC5 respectively query deployed service types and current load situations thereof, and determine whether the sub service request 1 and/or the sub service request 2 can be processed. For the determining processes, refer to the first case in step 503. Details are not described herein again. For example, the MEC2 determines that the MEC2 can process the sub service request 1, and sends an acknowledgment message corresponding to the sub service request 1 to the MEC1; the MEC3 determines that the MEC3 can process the sub service request 2, and sends an acknowledgment message corresponding to the sub service request 2 to the MEC1; and the MEC4 and the MEC5 determine that the MEC4 and the MEC5 cannot process any sub service request, and both send a rejection message to the MEC1. Specific forms and contents of the acknowledgment message and the rejection message are not limited herein.

Certainly, one MEC may also process the plurality of sub service requests. For example, the MEC3 can process the sub service request 1 and the sub service request 2, and may send two acknowledgment messages to the MEC1, or add identification information of the two sub service requests to one acknowledgment message. This is not limited herein.

Step 904: The MEC1 determines a target MEC based on the answer message.

A specific implementation step of step 904 is the same as that of step 704. Details are not described herein again.

Figure 10:
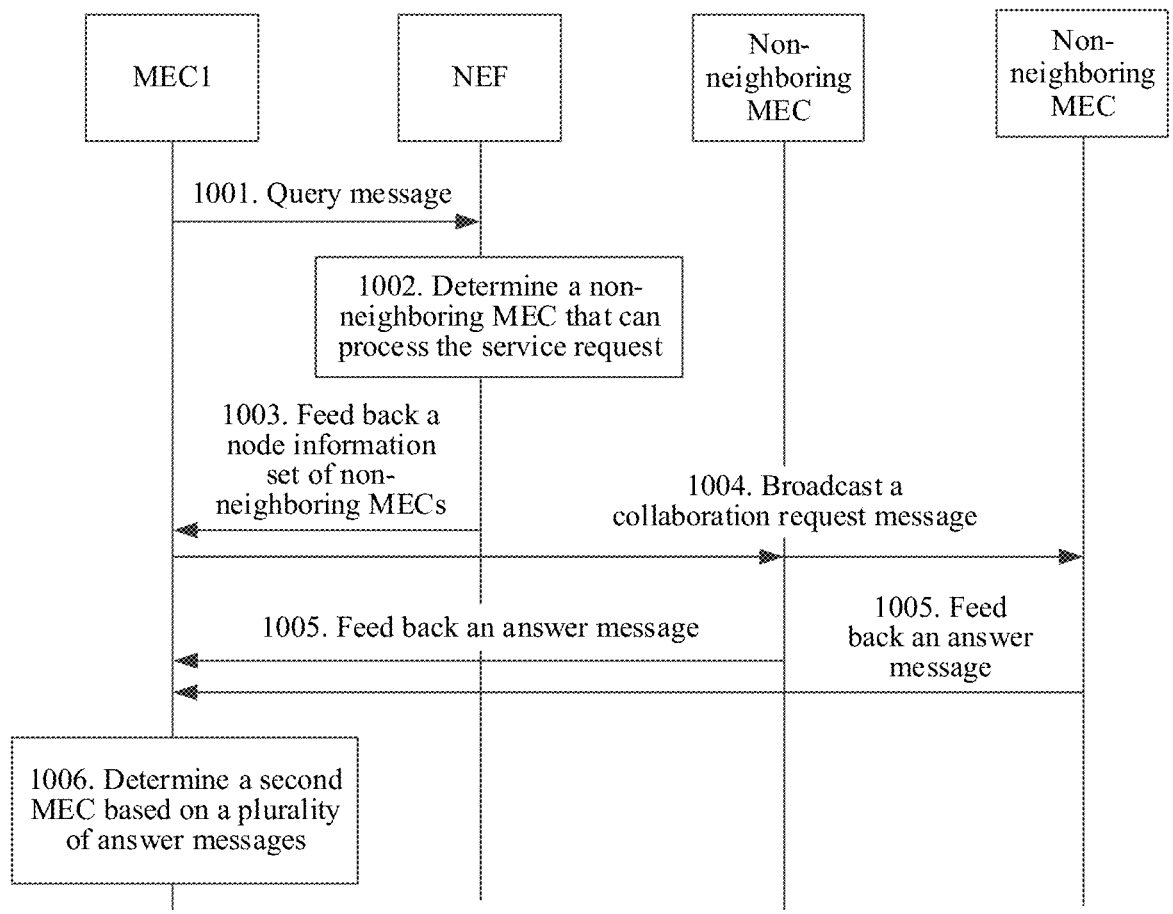
FIG. 10 is a flowchart of determining a second MEC by using a node information table in an NEF according to an embodiment of this application when the service processing method shown in FIG. 5B is used.

In a manner B, the target MEC is determined by using the node information table N_MECTable in the NEF. Referring to FIG. 10, a manner B includes:

Step 1001: The MEC1 sends the query information to the NEF.

In this embodiment of this application, the query information includes at least the service types and/or the request contents of the plurality of sub service requests.

Step 1002: The NEF determines, based on the query information, a non-neighboring device that can process the plurality of sub service requests.

Step 1003: The NEF sends a node information set of non-neighboring devices that can process the service request to the MEC1.

For specific implementation steps of step 1002 to step 1003, refer to step 802 to step 803. Details are not described herein again.

For example, by performing step 1002 to step 1003, the NEF determines that a set of neighboring devices that can process the plurality of sub service requests is the MEC6 to the MEC9.

Step 1004: The MEC1 receives the node information set, and broadcasts the collaboration request message to the plurality of MECs corresponding to the node information set.

In this embodiment of this application, the collaboration request message includes a service type of each sub service request and/or a request content of each sub service request.

It should be noted that, in this embodiment of this application, the name of the collaboration request message is not limited.

Step 1005: A non-neighboring device in the set of non-neighboring devices feeds back an answer message to the MEC1.

After the MEC6 to the MEC9 receive the collaboration request message, the MEC6 to the MEC9 respectively query deployed service types and current load situations thereof, determine whether the sub service request 1 and/or the sub service request 2 can be processed, and feed back answer messages to the MEC1. A form of the answer message is the same as that of step 803. Details are not described herein again.

Step 1006: The MEC1 determines the second MEC based on the answer message.

A specific implementation step of step 1006 is the same as that of step 704. Details are not described herein again.

In the specific implementation process, the MEC1 may determine the second MEC by using either of the foregoing two manners. Certainly, the foregoing two manners may be combined, thereby determining the second MEC. That is, the second MEC is first determined in the neighboring MECs in the manner A, and if the neighboring MEC cannot process the plurality of sub service requests, the second MEC is determined in the non-neighboring MECs in the manner B.

After step 605 is performed, the MEC1 determines the second MEC, and then step 606 is performed.

Step 606: The MEC1 sends a sub service request to the second MEC.

The MEC1 sends, after determining the second MEC, a sub service request Req_SubService that the second MEC can process to the second MEC.

For example, the MEC1 determines that the second MEC is the MEC6 and the MEC7, where the MEC6 is configured to process the sub service request 1, and the MEC7 is configured to process the sub service request 2, and the MEC1 sends the sub service request 1 to the MEC6 and sends the sub service request 2 to the MEC7.

By performing the foregoing steps, the MEC1 completes step 503. It should be noted that, in this implementation, the second service request is the plurality of sub service requests. Referring to FIG. 5B, the MEC1, after completing step 503, performs step 507 to step S010.

Step 507: The second MEC processes the sub service request, and sends service data corresponding to the sub service request to the MEC1.

The second MEC, after receiving the sub service request Req_SubService, processes the sub service request Req_SubService, to obtain a sub service result Req_SubResult corresponding to the sub service request Req_SubService, and sends the sub service result Req_SubResult to the MEC1. The sub service result Req_SubResult is the service data corresponding to the sub service request.

For example, the MEC6 processes the sub service request 1, to obtain a service result 1, and sends the service result 1 to the MEC1; and the MEC7 processes the sub service request 2, to obtain a service result 2, and sends the service result 2 to the MEC1.

Step 508: The MEC1 obtains, based on the received service data corresponding to the sub service request, the service data corresponding to the first service request.

When the MEC1 receives the service result that is sent by the target MEC and that corresponds to the sub service request, for example, receives a plurality of service results sent by a plurality of target MECs, the MEC1 may aggregate the plurality of service results, to obtain the service data corresponding to the first service request.

Step 509: Feeds back the service data to the base station.

Step 510: The base station feeds back the service data to the terminal device.

Certainly, if the service request is initiated by a third-party application, step 509 to step 510 are skipped, and the MEC1 directly feeds back the service data to the third-party application. That is, step 509 to step 510 are not necessary.

It should be noted that, for the third case, if the MEC1 determines that the second service request does not need to be sent to the second MEC, the MEC1 directly divides the service request Req_Service into the plurality of sub service requests, separately processes each sub service request, aggregates service results of the plurality of sub service requests, to obtain the service result Req_Result corresponding to the service request Req_Service, and finally feeds back the service result Req_Result to the UE or the third-party application. Details are not described herein again.

It should be noted that, after the MEC1 obtains the service data corresponding to the service request by performing the foregoing steps, the service data may further be buffered, to facilitate subsequent user access, so that the service request may be prevented from being parsed and processed again, and a network communication bandwidth and communication costs are reduced. Specifically, the MEC1 may determine whether its storage capacity is sufficient for buffering the service result Req_Result. If the storage capacity of the MEC1 is sufficient for buffering the service result Req_Result, the service result Req_Result is added into the data resource table M_ResourceTable; and if the storage capacity of the MEC1 is insufficient for buffering the service result Req_Result, the neighboring node information table M_NeigNodeTable is queried for a neighboring MEC that can store the service result Req_Result. If the neighboring MEC satisfying the requirement is found, the service result Req_Result is sent to the MEC for storage; and if no neighboring MEC can buffer the service result Req_Result, the MEC1 may send the service result Req_Result to the NEF for storage.

In the foregoing technical solutions, if the MEC1 cannot process the service request, another MEC may be requested to perform processing. Alternatively, a plurality of MECs may process a same service request, so that an effect of collaborative processing among the plurality of MECs is achieved, and resource utilization of the MEC may be improved. Because the plurality of MECs may collaboratively process the same service request, a time length of processing the service request can be reduced, and user access experience is improved.

Figure 11:
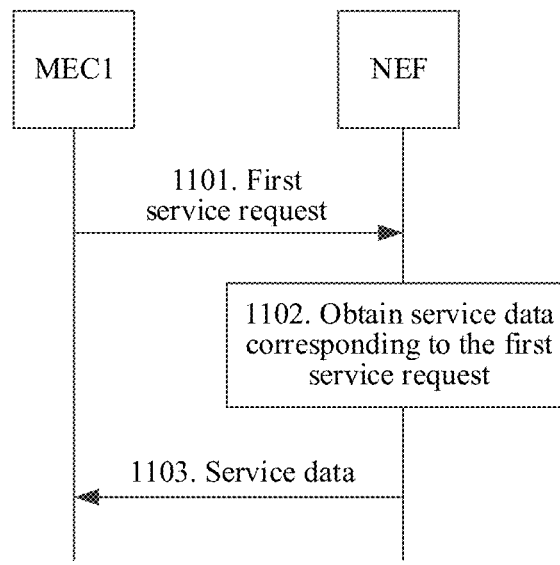
FIG. 11 is a flowchart of a service processing method according to another embodiment of this application.

A management device is further disposed in the capability exposure architecture shown in FIG. 3, and a service type table is also deployed on the management device, that is, the management device can also process the service request. In view of this, another embodiment of this embodiment provides a service processing method. Referring to FIG. 11, a procedure of the method is described as follows:

Step 1101: An MEC1 sends a first service request to an NEF.

In a specific implementation process, the MEC1 may receive the first service request with reference to the implementation in step 501 to the step 503. Details are not described herein again.

In this embodiment of this application, the first service request may be an original service request received by the MEC1, or may be a service request obtained after the MEC1 processes the original service request. A specific process may be: The MEC1 parses, after receiving the original service request, the original service request, to obtain service types and requested service contents of the original service request, performs re-encapsulation based on one or more factors in the service types and the requested service contents of the original service request, and identification information of the MEC1, and uses an encapsulated service request as the first service request. This is not limited herein.

After obtaining the first service request, the MEC1 may send the first service request to the NEF by using either of the following two manners. A specific process is as follows:

First Sending Manner:

The MEC1 directly sends the first service request to the NEF.

Second Sending Manner:

The MEC1, after obtaining the first service request, may use the method in FIG. 7 and/or FIG. 8, to first determine whether the first service request can be processed by a neighboring MEC or whether the first service request can be processed by a non-neighboring MEC. If both the neighboring MEC and the non-neighboring MEC cannot process the first service request, the MEC1 sends the first service request to the NEF.

Step 1102: The NEF receives the first service request, and obtains service data corresponding to the first service request.

In this embodiment of this application, step 1102 may specifically include the following three implementations. In a specific implementation process, one of the three implementations may be selected for execution.

First implementation: The NEF, after receiving the first service request, directly processes the first service request, thereby obtaining the service data corresponding to the first service request.

Second implementation: The NEF may pre-store identification information of a second MEC, for example, stores a number M_3 of the second MEC, so that the NEF, after receiving the first service request, directly sends a second service request to an MEC3, and the second MEC processes the second service request, and feeds back service data corresponding to the second service request to the NEF. The NEF obtains, based on the service data corresponding to the second service request, the service data corresponding to the first service request. In this embodiment of this application, the second service request includes at least part of the service type of the first service request and/or at least part of the service content of the first service request, and may include identification information of the MEC1.

Third implementation: The NEF first determines the second MEC based on an information list of mobile edge computing devices deployed on the NEF, and then sends the second service request to the second MEC. Subsequently, the second MEC processes the second service request, and feeds back the service data corresponding to the second service request to the NEF. The NEF obtains, based on the service data corresponding to the second service request, the service data corresponding to the first service request. In this embodiment of this application, the second service request includes at least part of the service type of the first service request and/or at least part of the service content of the first service request, and may include identification information of the MEC1. The information list of mobile edge computing devices includes information of the second MEC. For example, the information list of mobile edge computing devices includes the number of the second MEC or numbers of all MECs. Certainly, the information list of mobile edge computing devices may further include the identification information of the mobile edge computing device and a service type and/or service content deployed on the corresponding mobile edge computing device. This is not limited herein.

It should be noted that, there may be one or more second MECs. This is not limited in this embodiment of this application.

In the foregoing three sending manners, an implementation process of the first sending manner is relatively simple. Details are not described again in the following descriptions. Because the third sending manner includes a main step in the second sending manner, the following describes only the implementation process of the third sending manner in detail. For the implementation processes of the second sending manner and the third sending manner, refer to descriptions of corresponding steps in the third sending manner. Details are not described again in this embodiment of this application.

Figure 12A:
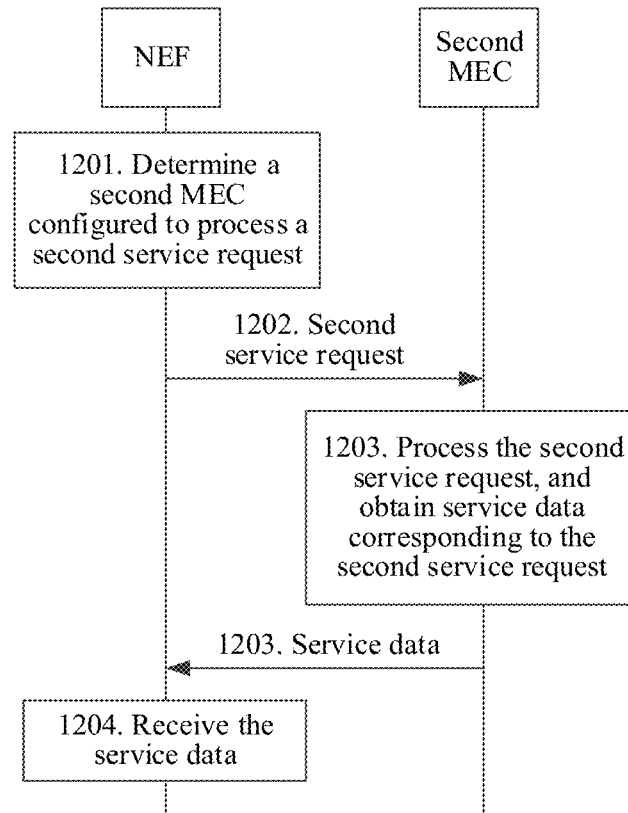
FIG. 12A to FIG. 12B are flowcharts of a specific implementation of a third sending manner of step 1102 according to another embodiment of this application.

In this embodiment of this application, it can be learned from step 601 that, different service requests may need different processing procedures. Depending on the different needed processing procedures, the service request mainly includes three cases: in a first case, the service request can be processed by one MEC alone; in a second case, the service request needs to be collaboratively processed by a plurality of MECs, where all of the plurality of MECs that perform collaborative processing provide a same service type; and in a third case, the request content of the service request needs to be divided into a plurality of independent service requests for processing. For the foregoing three cases, the third sending manner of step 1102 may include the following two implementations. In a specific implementation process, either of the two implementations may be selected for execution. A specific implementation is as follows:

For the first case, FIG. 12A is a flowchart of a first implementation of the third sending manner of step 1102. Specific steps are as follows:

Step 1201: The NEF determines the second MEC configured to process the second service request.

The NEF, after receiving the first service request, queries for a keyword in a node information table N_MECTable, where the keyword includes at least service types Req_Type and/or request contents Req_KeyContent of a new service request Req_Service, to search for node information of an MEC matching the keyword. Specifically, the node information table N_MECTable may be searched for an MEC on the service type Req_Type is deployed on and/or the request content Req_KeyContent is stored.

For example, using an example in which the keyword is the service type Req_Type, the NEF determines that the service types Req_Type is deployed on an MEC6, and determines that the MEC6 is a target MEC.

Step 1202: The NEF sends the second service request to the second MEC.

In this implementation, the second service request may be completely the same as the first service request. That is, the second service request is the first service request, and the second service request includes all the service types of the first service request and/or all the service contents of the first service request. The NEF, after determining the second MEC, directly forwards the first service request to the second MEC. Certainly, the NEF, after determining the second MEC, may encapsulate all the service types of the first service request and/or the service contents of the first service request and identification information of the MEC1, to obtain the second service request having a same substantial content, but different encapsulation, and then send the second service request to the second MEC. This is not limited herein.

Step 1203: The second MEC receives and processes the second service request, and sends the service data corresponding to the second service request to the NEF.

In a specific implementation process, the second MEC, after receiving the second service request sent by the NEF, may directly process the second service request; or may first determine, based on one or more factors in the service types Req_Type and the request contents Req_KeyContent, and a current load situation M_Workload, whether the second MEC can process the second service request. If the second MEC can process the second service request, the second MEC processes the second service request, and sends the service data corresponding to the second service request to the NEF.

Step 1204: The NEF receives the service data corresponding to the second service request.

In this implementation, because the second service request includes all the service types of the first service request and/or all the service contents of the first service request, the service data that corresponds to the second service request and that is sent by the second MEC is the service data corresponding to the first service request, so that the NEF obtains the service data corresponding to the first service request.

It should be noted that, if the second MEC determines, by performing step 1203, that the second MEC cannot process the second service request, the second MEC may send a rejection message to the NEF, and when the NEF receives the rejection message sent by the second MEC, the NEF processes the second service request, and obtains the service data corresponding to the second service request. For a specific form of the rejection message, refer to step 703. Details are not described herein again.

Figure 12B:
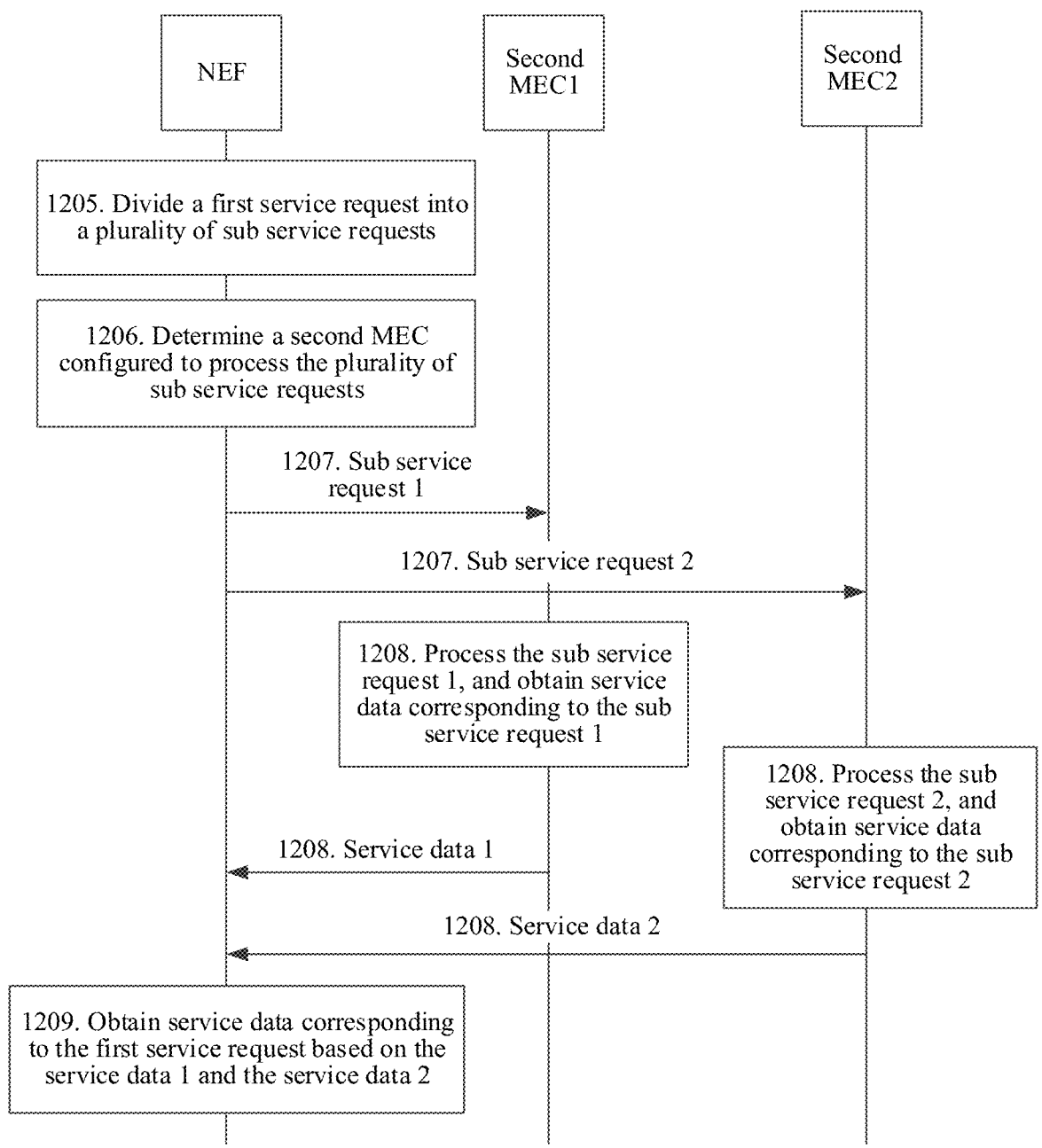

For the second case and the third case, FIG. 12B is a flowchart of a second implementation of the third sending manner of step 1102. Specific steps are as follows:

Step 1205: The NEF divides the first service request into a plurality of sub service requests, where the plurality of sub service requests are the second service request.

The NEF, after receiving the first service request, may determine the first service request based on the service types and/or the service contents of the first service request, to divide the first service request into the plurality of independent service requests, so that the NEF re-encapsulates the first service request into the plurality of sub service requests. Each sub service request Req_SubService includes a service type Req_Type of the sub service request and/or a service content Req_KeyContent of the sub service request. Certainly, each sub service request Req_SubService may further include identification information of the MEC1.

The following descriptions are made by using an example in which the plurality of sub service requests represent the second service request.

Step 1206: The NEF determines the second MEC configured to process the plurality of sub service requests.

In a specific implementation process, the NEF, after dividing the first service request into the plurality of sub service requests, queries for a keyword in the node information table N_MECTable, where the keyword includes at least the service types Req_Type and/or the request contents Req_KeyContent of the plurality of sub service requests, to search for node information of an MEC matching the keyword. Therefore, a set of MECs that can be configured to process the plurality of sub service requests is determined in all MECs. Subsequently, the NEF broadcasts a collaboration request message to each MEC in the set of MECs that can be configured to process the plurality of sub service requests, and determines the second MEC based an answer message of each MEC.

For a specific implementation of step 1206, refer to step 1002 to step 1006. Details are not described herein again.

It should be noted that, in this implementation, the second MEC may be a plurality of MECs. For example, each sub service request needs to be processed by one MEC.

Step 1207: The NEF sends a corresponding sub service request to the second MEC.

Step 1208: The second MEC receives the corresponding sub service request, processes the sub service request, and sends service data corresponding to the sub service request to the NEF.

Step 1209: The NEF obtains, based on the service data sent by the second MEC, the service data corresponding to the service request.

Specifically, when there are a plurality of second MECs, the NEF may aggregate service data sent by respective MECs, to obtain the service data corresponding to the service request.

After the NEF obtains, by means of the foregoing steps, the service data corresponding to the first service request, step 1103 is performed.

Step 1103: The NEF sends the service data corresponding to the first service request to the MEC1.

It should be noted that, after the MEC1 obtains the service data corresponding to the service request by performing the foregoing steps, the service data may further be buffered. A specific implementation is the same as that of the foregoing embodiment, and details are not described herein again.

In the foregoing technical solutions, the MEC1, after receiving the service request, first performs pre-processing on the service request, including extracting a service feature, service types, and key data, re-encapsulates the service request into a new service request, and sends the new service request to the NEF. The NEF schedules the new service request in a centralized manner, performs service matching based on service types, a functional module, and a workload deployed on each MEC, and selects an optimal appropriate MEC node, so that resource utilization of the MEC can be improved.

Figure 13:
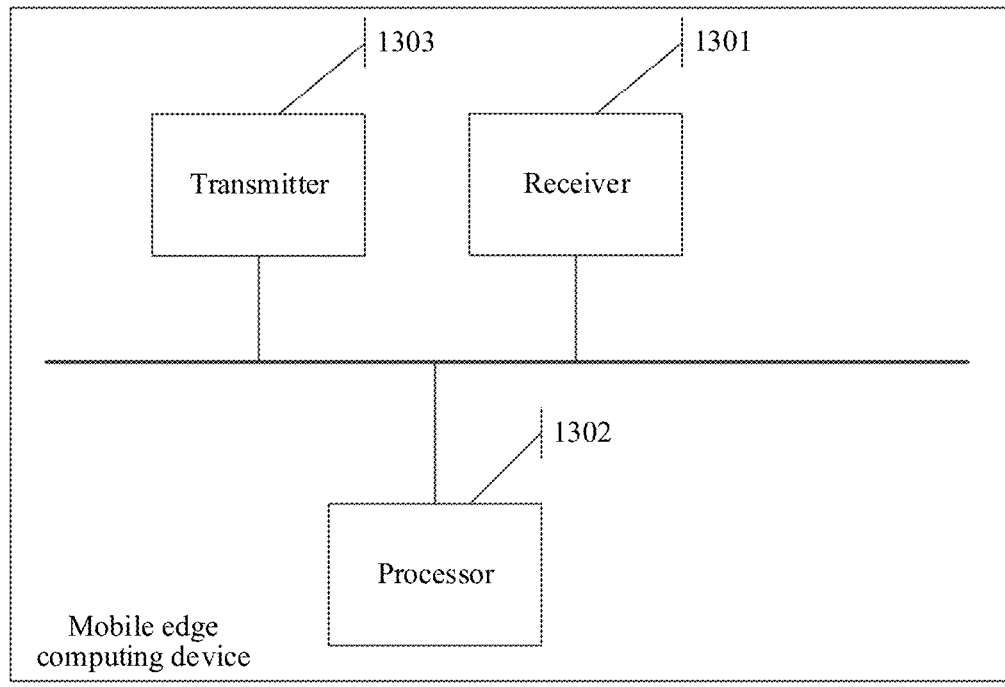
FIG. 13 is a schematic structural diagram of a mobile edge computing device according to an embodiment of this application.

Based on the foregoing embodiments of this application, an embodiment of this application further provides a mobile edge computing device. The mobile edge computing device may implement corresponding steps performed by the MEC1 in the embodiments shown in FIG. 5A to FIG. 12B. Referring to FIG. 13, the mobile edge computing device includes a receiver, a processor, and a transmitter.

The processor 1302 may be a central processing unit (CPU) or an application-specific integrated circuit (ASIC), or may be one or more integrated circuits configured to control execution of a program, or may be a baseband chip or the like.

The receiver 1301 and the transmitter 1303 may be connected to the processor 1302 by using a bus structure, a star-shaped structure, or another structure, or may be connected to the processor 1302 by using a dedicated connection cable.

The network apparatus may further include a memory. The memory may be connected to the processor 1302 by using a bus structure, a star-shaped structure, or another structure. There may be one or more memories. The memory may be a read-only memory (ROM), a random access memory (RAM), a magnetic disk memory, or the like. The memory may be configured to store program code required by the processor 1302 for performing a task, and may further be configured to store data.

The receiver 1301 is configured to receive a first service request, where the first service request includes a service type and/or service content.

The transmitter 1303 is configured to send a second service request generated by the processor 1302 to a second mobile edge computing device, where the second service request includes at least part of the service type and/or at least part of the service content, and identification information of the first mobile edge computing device.

The receiver 1301 is further configured to receive service data corresponding to the second service request from the second mobile edge computing device.

In a possible implementation, the processor 1302 is configured to:

before the transmitter sends the second service request to the second mobile edge computing device, determine, based on a service type and/or service content deployed on the mobile edge computing device, that the mobile edge computing device needs to send the second service request to the second mobile edge computing device.

In a possible implementation, the processor 1302 is configured to:

before the transmitter 1303 sends the second service request to the second mobile edge computing device, determine, based on an information list of mobile edge computing devices, the second mobile edge computing device, where the information list of mobile edge computing devices includes information of the second mobile edge computing device.

In a possible implementation, the information list of mobile edge computing devices includes identification information of at least one mobile edge computing device; or the information list of mobile edge computing devices includes the identification information of the at least one mobile edge computing device and a service type and/or service content deployed on the corresponding mobile edge computing device.

In a possible implementation, the processor 1302 is configured to:

query the information list of mobile edge computing devices, to determine at least one mobile edge computing device that can be configured to process the second service request;

control the transmitter 1303 to send a first inquiry message to the at least one mobile edge computing device, where the first inquiry message includes at least part of the service type and/or at least part of the service content;

control the receiver 1301 to receive an answer message from the at least one mobile edge computing device; and determine, based on the answer message, the second mobile edge computing device in the at least one mobile edge computing device.

In a possible implementation, the processor 1302 is configured to:

control the transmitter 1303 to send a query request to the management device, where the query request includes at least part of the service type and/or at least part of the service content;

control the receiver 1301 to receive at least one piece of identification information corresponding to at least one mobile edge computing device from the management device, where the information list of mobile edge computing devices includes at least one piece of identification information; and determine, based on the at least one piece of identification information, the second mobile edge computing device in the at least one mobile edge computing device.

In a possible implementation, the processor 1302 is configured to:

obtain, based on the service data corresponding to the second service request, service data corresponding to the first service request; and control the transmitter 1303 to send the service data corresponding to the first service request.

The receiver 1301, the processor 1302, and the transmitter 1303 are designed and programmed, to solidify code corresponding to the foregoing service processing method into a chip, so that when run, the chip can perform the foregoing service processing method. How to design and program the processor 1301, the processor 1302, and the transmitter 1303 is a well-known technology to a person skilled in the art. Details are not described herein again.

Figure 14:
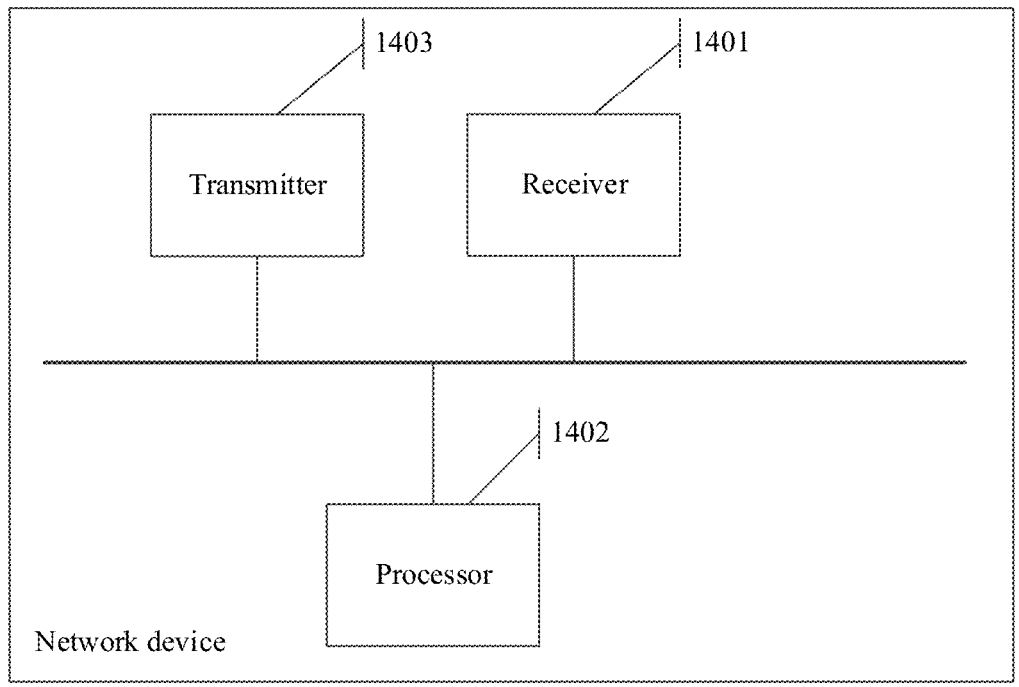
FIG. 14 is a schematic structural diagram of a network device according to an embodiment of this application.

Based on the foregoing embodiments of this application, an embodiment of this application further provides a network device. The network device may implement corresponding steps performed by the NEF in the embodiments shown in FIG. 5A to FIG. 12B. Referring to FIG. 14, the network device includes: a receiver 1401, a processor 1402, and a transmitter 1403.

For hardware structures, connection relationships, and quantities of the receiver 1401, the processor 1402, and the transmitter 1403, refer to the receiver, the processor, and the transmitter in the mobile edge computing device shown in FIG. 13. Details are not described herein again.

The receiver 1401 is configured to receive a first service request from a first mobile edge computing device, where the first service request includes a service type and/or service content.

The transmitter 1403 is configured to send, based on control of the processor 1402, service data corresponding to the first service request to the first mobile edge computing device.

In a possible implementation, the transmitter 1403 is configured to:

send, based on control of the processor 1402, a second service request to a second mobile edge computing device, where the second service request includes at least part of the service type and/or at least part of the service content.

The receiver 1401 is configured to:

receive service data corresponding to the second service request from the second mobile edge computing device.

In a possible implementation, the processor 1402 is configured to:

before the transmitter 1403 sends the second service request to the second mobile edge computing device, determine, based on an information list of mobile edge computing devices that is deployed on the network device, the second mobile edge computing device, where the information list of mobile edge computing devices includes information of the second mobile edge computing device.

In a possible implementation, the information list of mobile edge computing devices includes identification information of a mobile edge computing device and a service type and/or service content deployed on the corresponding mobile edge computing device.

In a possible implementation, the processor 1402 is configured to:

obtain, based on the service data corresponding to the second service request, the service data corresponding to the first service request; and control the transmitter 1403 to send the service data corresponding to the first service request to the first mobile edge computing device.

The receiver 1401, the processor 1402, and the transmitter 1403 are designed and programmed, to solidify code corresponding to the foregoing service processing method into a chip, so that when run, the chip can perform the foregoing service processing method. How to design and program the processor 1401, the processor 1402, and the transmitter 1403 is a well-known technology to a person skilled in the art. Details are not described herein again.

Figure 15:
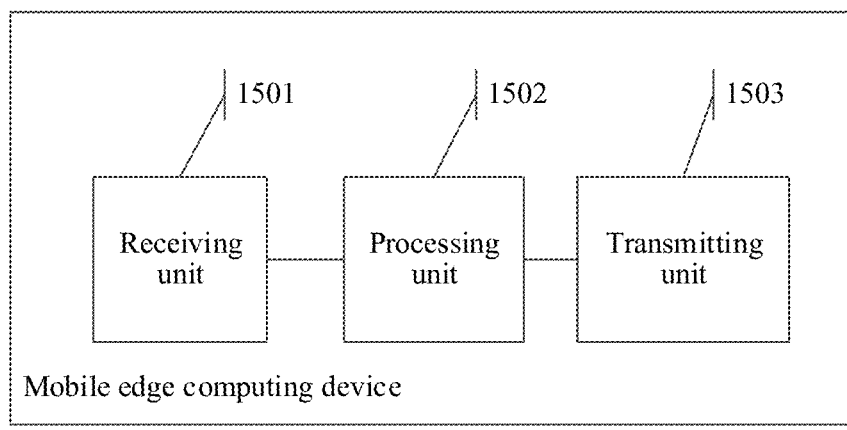
FIG. 15 is another schematic structural diagram of a mobile edge computing device according to an embodiment of this application.

Based on the foregoing embodiments of this application, an embodiment of this application further provides a simplified functional block diagram of a mobile edge computing device. The network device may implement corresponding steps performed by the MEC1 in the embodiments shown in FIG. 5A to FIG. 12B. Referring to FIG. 15, the mobile edge computing device includes a receiving unit 1501, a processing unit 1502, and a transmitting unit 1503.

In an actual application, a network element device corresponding to the receiving unit 1501 may be the receiver 1301 in FIG. 13, a network element device corresponding to the transmitting unit 1503 may be the transmitter 1303 in FIG. 13, and a network element device corresponding to the processing unit 1502 may be the transmitter 1302 in FIG. 13.

The receiving unit 1501 is configured to receive a first service request, where the first service request includes a service type and/or service content.

The transmitting unit 1503 is configured to send a second service request generated by the processing unit 1502 to a second mobile edge computing device, where the second service request includes at least part of the service type and/or at least part of the service content, and identification information of the first mobile edge computing device.

The receiving unit 1501 is further configured to receive service data corresponding to the second service request from the second mobile edge computing device.

In a possible implementation, the processing unit 1502 is configured to:

before the transmitting unit 1503 sends the second service request to the second mobile edge computing device, determine, based on a service type and/or service content deployed on the mobile edge computing device, that the mobile edge computing device needs to send the second service request to the second mobile edge computing device.

In a possible implementation, the processing unit 1502 is configured to:

before the transmitting unit 1503 sends the second service request to the second mobile edge computing device, determine, based on an information list of mobile edge computing devices, the second mobile edge computing device, where the information list of mobile edge computing devices includes information of the second mobile edge computing device.

In a possible implementation, the information list of mobile edge computing devices includes identification information of at least one mobile edge computing device; or the information list of mobile edge computing devices includes the identification information of the at least one mobile edge computing device and a service type and/or service content deployed on the corresponding mobile edge computing device.

In a possible implementation, the processing unit 1502 is configured to:

query the information list of mobile edge computing devices, to determine at least one mobile edge computing device that can be configured to process the second service request;

control the transmitting unit 1503 to send a first inquiry message to the at least one mobile edge computing device, where the first inquiry message includes at least part of the service type and/or at least part of the service content;

control the receiving unit 1501 to receive an answer message from the at least one mobile edge computing device; and determine, based on the answer message, the second mobile edge computing device in the at least one mobile edge computing device.

In a possible implementation, the processing unit 1502 is configured to:

control the transmitting unit 1503 to send a query request to the management device, where the query request includes at least part of the service type and/or at least part of the service content;

control the receiving unit 1501 to receive at least one piece of identification information corresponding to at least one mobile edge computing device from the management device, where the information list of mobile edge computing devices includes at least one piece of identification information; and determine, based on the at least one piece of identification information, the second mobile edge computing device in the at least one mobile edge computing device.

In a possible implementation, the processing unit 1502 is configured to:

obtain, based on the service data corresponding to the second service request, service data corresponding to the first service request; and control the transmitting unit 1503 to send the service data corresponding to the first service request.

Figure 16:
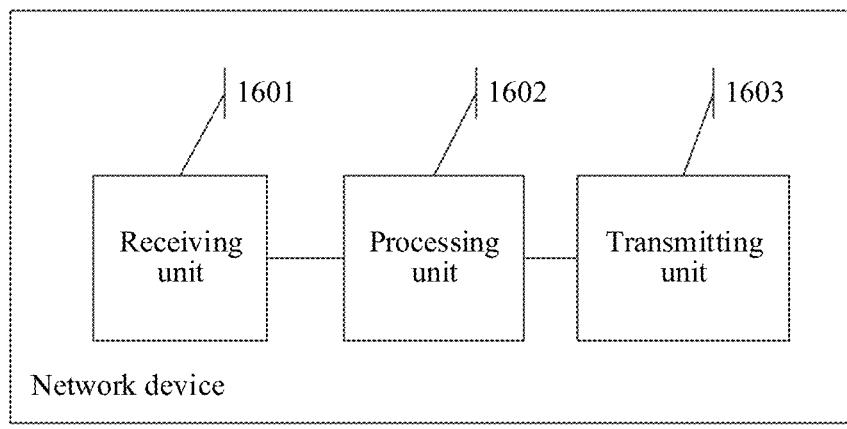
FIG. 16 is another schematic structural diagram of a network device according to an embodiment of this application.

Based on the foregoing embodiments of this application, an embodiment of this application further provides a simplified functional block diagram of a network device. The network device may implement corresponding steps performed by the NEF in the embodiments shown in FIG. 5A to FIG. 12B. Referring to FIG. 16, the network device includes a receiving unit 1601, a processing unit 1602, and a transmitting unit 1603.

In an actual application, a network element device corresponding to the receiving unit 1601 may be the receiver 1401 in FIG. 14, a network element device corresponding to the transmitting unit 1603 may be the transmitter 1403 in FIG. 14, and a network element device corresponding to the processing unit 1602 may be the transmitter 1402 in FIG. 14.

The receiving unit 1601 is configured to receive a first service request from a first mobile edge computing device, where the first service request includes a service type and/or service content.

The transmitting unit 1603 is configured to send, based on control of the processing unit 1602, service data corresponding to the first service request to the first mobile edge computing device.

In a possible implementation, the transmitting unit 1603 is configured to:

send, based on control of the processing unit 1602, a second service request to a second mobile edge computing device, where the second service request includes at least part of the service type and/or at least part of the service content.

The receiving unit 1601 is configured to:

receive service data corresponding to the second service request from the second mobile edge computing device.

In a possible implementation, the processing unit 1602 is configured to:

before the transmitting unit 1603 sends the second service request to the second mobile edge computing device, determine, based on an information list of mobile edge computing devices that is deployed on the network device, the second mobile edge computing device, where the information list of mobile edge computing devices includes information of the second mobile edge computing device.

In a possible implementation, the information list of mobile edge computing devices includes identification information of a mobile edge computing device and a service type and/or service content deployed on the corresponding mobile edge computing device.

In a possible implementation, the processing unit 1602 is configured to:

obtain, based on the service data corresponding to the second service request, the service data corresponding to the first service request; and control the transmitting unit 1603 to send the service data corresponding to the first service request to the first mobile edge computing device.

The mobile edge computing device and the network device provided in this application may be a chip system. The chip system may include at least one chip, and may further include another discrete device. The chip system may be set in a mobile edge computing device or a network device, to support the mobile edge computing device or the network device in completing the service processing method provided in the embodiments of this application.

An embodiment of this application provides a computer storage medium. The computer storage medium stores an instruction. When run on a computer, the instruction enables the computer to perform the foregoing service processing method.

An embodiment of this application provides a computer program product. The computer program product includes an instruction. When run on a computer, the instruction enables the computer to perform the foregoing service processing method.

In the foregoing technical solutions, after the mobile edge computing device receives the service request, some or all services in the service request may be forwarded to another mobile edge computing device for processing. In this way, when a particular mobile edge computing device receives a large quantity of service requests, the service request may be forwarded to a relatively idle mobile edge computing device for processing, so that the plurality of mobile edge computing devices may collaboratively process the service requests, and resource utilization of the mobile edge computing device can be improved.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive Solid State Disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service processing method, comprising:
    receiving, by a first mobile edge computing device, a first service request, wherein the first service request comprises a service type and/or service content;
    sending, by the first mobile edge computing device, a second service request to a second mobile edge computing device, wherein the second service request comprises at least part of the service type and/or at least part of the service content, and identification information of the first mobile edge computing device; and
    receiving, by the first mobile edge computing device, service data corresponding to the second service request from the second mobile edge computing device,
    wherein before the sending, by the first mobile edge computing device, the second service request to the second mobile edge computing device, the method further comprises:
    determining, by the first mobile edge computing device based on an information list of mobile edge computing devices, the second mobile edge computing device, wherein the information list of mobile edge computing devices comprises information of the second mobile edge computing device,
    wherein:
        the information list of mobile edge computing devices comprises identification information of at least one mobile edge computing device; or
        the information list of mobile edge computing devices comprises the identification information of the at least one mobile edge computing device and a service type and/or service content deployed on the at least one mobile edge computing device; and
    wherein the information list of mobile edge computing devices is deployed in the first mobile edge computing device, and the determining, by the first mobile edge computing device based on the information list of mobile edge computing devices, the second mobile edge computing device comprises:
    querying, by the first mobile edge computing device, the information list of mobile edge computing devices to determine one or more mobile edge computing devices capable of being configured to process the second service request;
    sending, by the first mobile edge computing device, a first inquiry message to the one or more mobile edge computing devices, wherein the first inquiry message comprises at least part of the service type and/or at least part of the service content;
    receiving, by the first mobile edge computing device, an answer message from the one or more mobile edge computing devices; and
    determining, by the first mobile edge computing device based on the answer message, the second mobile edge computing device in the one or more mobile edge computing devices.

2. The method according to claim 1, wherein before the sending, by the first mobile edge computing device, the second service request to the second mobile edge computing device, the method further comprises:
    determining, by the first mobile edge computing device based on a service type and/or service content deployed on the first mobile edge computing device, that the first mobile edge computing device needs to send the second service request to the second mobile edge computing device.

3. The method according to claim 1, wherein the information list of mobile edge computing devices is deployed in a management device, and the determining, by the first mobile edge computing based on the information list of mobile edge computing devices, the second mobile edge computing device comprises:
    sending, by the first mobile edge computing device, a query request to the management device, wherein the query request comprises at least part of the service type and/or at least part of the service content;
    receiving, by the first mobile edge computing device, at least one piece of identification information corresponding to one or more mobile edge computing devices from the management device, wherein the information list of mobile edge computing devices comprises the at least one piece of identification information; and determining, by the first mobile edge computing device based on the at least one piece of identification information, the second mobile edge computing device in the at least one mobile edge computing device.

4. The method according to claim 1, wherein the method further comprises:

obtaining, by the first mobile edge computing device based on the service data corresponding to the second service request, service data corresponding to the first service request; and sending, by the first mobile edge computing device, the service data corresponding to the first service request.

5. A mobile edge computing device, comprising: a receiver, a processor, and a transmitter, wherein:

the receiver is configured to receive a first service request, wherein the first service request comprises a service type and/or service content;

the transmitter is configured to send a second service request generated by the processor to a second mobile edge computing device, wherein the second service request comprises at least part of the service type and/or at least part of the service content, and identification information of the first mobile edge computing device;

the receiver is further configured to receive service data corresponding to the second service request from the second mobile edge computing device; and before the transmitter sends the second service request to the second mobile edge computing device, the processor is configured to determine, based on an information list of mobile edge computing devices, the second mobile edge computing device, wherein the information list of mobile edge computing devices comprises information of the second mobile edge computing device, wherein:

the information list of mobile edge computing devices comprises identification information of at least one mobile edge computing device; or the information list of mobile edge computing devices comprises the identification information of the at least one mobile edge computing device and a service type and/or service content deployed on the corresponding mobile edge computing device, and wherein the processor is further configured to:

query the information list of mobile edge computing devices to determine one or more mobile edge computing devices that can be configured to process the second service request;

control the transmitter to send a first inquiry message to the one or more mobile edge computing devices, wherein the first inquiry message comprises at least part of the service type and/or at least part of the service content;

control the receiver to receive an answer message from the one or more mobile edge computing devices; and determine, based on the answer message, the second mobile edge computing device in the one or more mobile edge computing devices.

6. The device according to claim 5, wherein the processor is configured to:

before the transmitter sends the second service request to the second mobile edge computing device, determine, based on a service type and/or service content deployed on the mobile edge computing device, that the mobile edge computing device needs to send the second service request to the second mobile edge computing device.

7. The device according to claim 5, wherein the transmitter is further configured to send a query request to a management device, wherein the query request comprises at least part of the service type and/or at least part of the service content;

wherein the receiver is further configured to receive at least one piece of identification information corresponding to one or more mobile edge computing devices from the management device, wherein the information list of mobile edge computing devices comprises at least one piece of identification information; and wherein the processor is further configured to determine, based on the at least one piece of identification information, the second mobile edge computing device in the one or more mobile edge computing devices.

8. The device according to claim 5, wherein the processor is configured to:

obtain, based on the service data corresponding to the second service request, service data corresponding to the first service request; and wherein the transmitter is further configured to send the service data corresponding to the first service request.

9. A network device, comprising a receiver, a processor, and a transmitter, wherein:

the receiver is configured to receive a first service request from a first mobile edge computing device, wherein the first service request comprises a service type and/or service content;

the transmitter is configured to:

send service data corresponding to the first service request to the first mobile edge computing device; and send a second service request to a second mobile edge computing device, wherein the second service request comprises at least part of the service type and/or at least part of the service content;

the receiver is further configured to receive service data corresponding to the second service request from the second mobile edge computing device; and before the transmitter sends the second service request to the second mobile edge computing device, the processor is configured to determine, based on an information list of mobile edge computing devices that is deployed on the network device, the second mobile edge computing device, wherein the information list of mobile edge computing devices comprises information of the second mobile edge computing device, wherein the information list of mobile edge computing devices comprises identification information of a mobile edge computing device and a service type and/or service content deployed on the mobile edge computing device, and wherein the processor is further configured to:

query the information list of mobile edge computing devices to determine one or more mobile edge computing devices that can be configured to process the second service request;

control the transmitter to send a first inquiry message to the one or more mobile edge computing devices, wherein the first inquiry message comprises at least part of the service type and/or at least part of the service content;

control the receiver to receive an answer message from the one or more mobile edge computing devices; and determine, based on the answer message, the second mobile edge computing device in the one or more mobile edge computing devices.

10. The device according to claim 9, wherein the processor is configured to obtain, based on the service data corresponding to the second service request, the service data corresponding to the first service request; and wherein the transmitter is further configured to send the service data corresponding to the first service request to the first mobile edge computing device.

\* \* \* \* \*